(12) United States Patent
Ziraknejad et al.

(10) Patent No.: US 11,238,210 B2
(45) Date of Patent: Feb. 1, 2022

(54) GENERATING AND PRESENTING CUSTOMIZED INFORMATION CARDS

(71) Applicant: MicroStrategy Incorporated, Vienna, VA (US)

(72) Inventors: Siamak Ziraknejad, Reston, VA (US); Jiao Xu, Oakton, VA (US); Boyu Li, Herndon, VA (US); Quan Jia, Oakton, VA (US); Saurabh Abhyankar, McLean, VA (US); Timothy Lang, McLean, VA (US)

(73) Assignee: MicroStrategy Incorporated, Vienna, VA (US)

( * ) Notice: Subject to any disclaimer, the term of this patent is extended or adjusted under 35 U.S.C. 154(b) by 0 days.

(21) Appl. No.: 16/730,417

(22) Filed: Dec. 30, 2019

(65) Prior Publication Data
US 2020/0143102 A1    May 7, 2020

Related U.S. Application Data

(63) Continuation-in-part of application No. 16/247,892, filed on Jan. 15, 2019, and a continuation-in-part of application No. 16/248,659, filed on Jan. 15, 2019.
(Continued)

(51) Int. Cl.
*G06F 40/106* (2020.01)
*G06F 16/9038* (2019.01)
(Continued)

(52) U.S. Cl.
CPC ........ *G06F 40/106* (2020.01); *G06F 16/9038* (2019.01); *G06F 21/31* (2013.01);
(Continued)

(58) Field of Classification Search
CPC .. G06F 16/248; G06F 16/242; G06F 16/2434; G06F 16/2428
See application file for complete search history.

(56) References Cited

U.S. PATENT DOCUMENTS 6,006,242 A   12/1999 Poole et al.
6,209,005 B1   3/2001 Harker et al.
(Continued)

FOREIGN PATENT DOCUMENTS

GB     2354851    4/2001

OTHER PUBLICATIONS

"Screenshots Showing Example of Grammarly Web Browser Extension", Aug. 19, 2019, 2 pages.
(Continued)

*Primary Examiner* — Ryan F Pitaro
(74) *Attorney, Agent, or Firm* — Fish & Richardson P.C.

(57) ABSTRACT

Methods, systems, apparatus, and computer-readable media for generating and presenting customized information cards. In some implementations, an indication of a data set is received. Data indicating a selection of an element of the data set is received. An indication of items in the data set that are associated with the selected element is received. Data is received indicating a selection of one or more of the items that are associated with the selected element of the data set. Card data defining an information card for the selected element of the data set is stored. The card definition data can indicate the selected one or more items and a reference to the data set.

20 Claims, 10 Drawing Sheets

Related U.S. Application Data

(60) Provisional application No. 62/810,498, filed on Feb. 26, 2019, provisional application No. 62/802,047, filed on Feb. 6, 2019, provisional application No. 62/720,955, filed on Aug. 22, 2018.

(51) Int. Cl.
*G06F 21/31* (2013.01)
*G06N 20/00* (2019.01)
*G06F 16/9032* (2019.01)

(52) U.S. Cl.
CPC ....... *G06N 20/00* (2019.01); *G06F 16/90328* (2019.01); *G06F 2221/2141* (2013.01)

(56) References Cited

U.S. PATENT DOCUMENTS

| | | | |
|---|---|---|---|
| 6,584,479 B2 | 6/2003 | Igarashi et al. | |
| 7,630,965 B1 | 12/2009 | Erickson et al. | |
| 7,827,527 B1 | 11/2010 | Chiluvuri | |
| 8,413,045 B2 | 4/2013 | Lemonik et al. | |
| 8,539,336 B2 | 9/2013 | Griffiths et al. | |
| 8,782,552 B2 | 7/2014 | Batman et al. | |
| 9,412,208 B2 | 8/2016 | Greenberg et al. | |
| 9,582,154 B2 | 2/2017 | Greenberg et al. | |
| 9,582,913 B1 | 2/2017 | Kraft et al. | |
| 10,051,107 B1 | 8/2018 | Prasad et al. | |
| 11,003,323 B1 | 4/2021 | Fan et al. | |
| 2002/0160805 A1 | 10/2002 | Laitinen et al. | |
| 2006/0065707 A1 | 3/2006 | Kanatani et al. | |
| 2006/0293904 A1 | 12/2006 | Ramanathan et al. | |
| 2007/0174350 A1 | 7/2007 | Pell et al. | |
| 2008/0104052 A1 | 5/2008 | Ryan et al. | |
| 2008/0104501 A1* | 5/2008 | Sattler | G06F 40/186 715/224 |
| 2008/0209329 A1 | 8/2008 | DeFranco et al. | |
| 2008/0243834 A1 | 10/2008 | Rieman et al. | |
| 2008/0258881 A1 | 10/2008 | Manson et al. | |
| 2009/0164564 A1 | 6/2009 | Willis | |
| 2010/0176194 A1 | 7/2010 | Hodgkinson et al. | |
| 2010/0278453 A1 | 11/2010 | King | |
| 2011/0055250 A1* | 3/2011 | Nandy | G06F 16/248 707/769 |
| 2011/0119165 A1 | 5/2011 | Zee | |
| 2011/0246880 A1 | 10/2011 | Horton et al. | |
| 2012/0144286 A1 | 6/2012 | Bank et al. | |
| 2012/0278164 A1 | 11/2012 | Spivack | |
| 2013/0031454 A1 | 1/2013 | Griffiths et al. | |
| 2013/0031457 A1 | 1/2013 | Griffiths et al. | |
| 2013/0159848 A1 | 6/2013 | Banke et al. | |
| 2013/0283194 A1 | 10/2013 | Kopp et al. | |
| 2014/0122289 A1* | 5/2014 | Beck | G06Q 20/1085 705/26.5 |
| 2014/0172418 A1 | 6/2014 | Puppin | |
| 2014/0177819 A1* | 6/2014 | Vymenets | H04M 3/5183 379/265.09 |
| 2014/0229462 A1* | 8/2014 | Lo | G06F 16/24575 707/707 |
| 2014/0236978 A1 | 8/2014 | King et al. | |
| 2014/0278349 A1 | 9/2014 | Grieves et al. | |
| 2014/0365944 A1 | 12/2014 | Moore et al. | |
| 2015/0019221 A1 | 1/2015 | Lee et al. | |
| 2015/0082219 A1* | 3/2015 | Beck | G06Q 10/06398 715/771 |
| 2015/0356085 A1* | 12/2015 | Panda | G06N 5/04 707/748 |
| 2016/0103883 A1* | 4/2016 | Ramani | G06Q 10/00 707/725 |
| 2016/0124924 A1 | 5/2016 | Greenberg et al. | |
| 2016/0170981 A1 | 6/2016 | Morimoto et al. | |
| 2016/0352891 A1 | 12/2016 | Niu et al. | |
| 2016/0379117 A1 | 12/2016 | Faaborg | |
| 2017/0097926 A1* | 4/2017 | Ben-Tzur | G06F 40/106 |
| 2017/0109334 A1 | 4/2017 | Anglin et al. | |
| 2017/0178144 A1 | 6/2017 | Follet et al. | |
| 2017/0188213 A1* | 6/2017 | Nirantar | H04W 4/20 |
| 2017/0243132 A1* | 8/2017 | Sainani | G06N 20/00 |
| 2017/0366579 A1* | 12/2017 | Assuncao Aguiar | G06T 11/60 |
| 2018/0092547 A1 | 4/2018 | Tzvieli et al. | |
| 2018/0113865 A1 | 4/2018 | Najork et al. | |
| 2018/0225341 A1* | 8/2018 | Merg | G06F 16/332 |
| 2019/0035403 A1 | 1/2019 | Ramasamy et al. | |
| 2019/0057165 A1 | 2/2019 | Rosen et al. | |
| 2019/0197916 A1 | 6/2019 | Park | |
| 2020/0160612 A1* | 5/2020 | Bowen | G06N 5/04 |
| 2020/0327564 A1* | 10/2020 | Simard | G06Q 30/0203 |
| 2020/0401580 A1* | 12/2020 | Fitzpatrick | G06F 16/248 |

OTHER PUBLICATIONS community.microstrategy.com [online] "Amazon's Alexa: Key Analytics Applications That Deliver Voice-activated Reporting," May 2017, retrieved on May 21, 2020, retrieved from URL <https://community.microstrategy.com/s/article/Amazon-s-Alexa-Key-Analytics-Applications-That-Deliver-Voice-activated-Reporting?language=en_US>, 4 pages.

community.microstrategy.com [online], "How to Implement Voice-controlled Data Analytics with Amazon's Alexa", May 2017, retrieved on May 21, 2020, retrieved from URL <https://community.microstrategy.com/s/article/How-to-Implement-Voice-controlled-Data-Analytics-With-Amazon-s-Alexa?language=en_US>, 3 pages.

community.microstrategy.com [online], "HyperVoice and HyperVision," Feb. 2019, retrieved on May 21, 2020, retrieved from URL <https://community.microstrategy.com/s/question/0D544000073QxyCCAS/hypervoice-and-hypervision?language=en_US>.

community.microstrategy.com [online], "What is MicroStrategy HyperIntelligence?," 2019, retrieved on May 21, 2020, retrieved from URL <https://community.microstrategy.com/s/article/KB442388-What-is-MicroStrategy-HyperIntelligence?language=en_US> 12 pages.

doughenschen.com [online], "MicroStrategy Embeds Analytics into Any Web Interface" Feb. 2019, retrieved on May 21, 2020, retrieved from UR: <https://doughenschen.com/2019/02/10/microstrategy-embeds-analytics-into-any-web-interface/>, 6 pages.

eweek.com [online], "MicroStrategy Streamlines Analytics With 'Zero Clicks' UI," Jan. 2019, retrieved on May 21, 2020, retrieved from URL<https://www.eweek.com/enterprise-apps/microstrategy-streamlines-analytics-with-zero-clicks-ui.

idevnews.com [online], "MicroStrategy 2019 Brings AI/ML & Sematic Technologies to BI, Analytics," Feb. 2019, retrieved on May 21, 2020, retrieved from URL <https://www.idevnews.com/stories/7248/MicroStrategy-2019-Brings-AIML-Sematic-Technologies-to-BI-Analytics>, 3 pages.

Lippens, "Amazon's Alexa: Key Analytics Applications That Deliver VoiceActivated Reporting," May 2017, MicroStrategy, 23 pages.

Lippens, "Your Voice is Your Passport: Implementing Voice-driven Applications with Amazon Alexa," 2017, Microstrategy, 33 pages.

Lippens., "How to Implement Voice-controlled Data Analytics With Amazon's Alexa," May 2017, MicroStrategy, 4 pages.

microstrategy.com [online], "7 Trending Technology Sessions You Won't Want to Miss at MicroStrategy World 2019," Dec. 2018, retrieved on May 21, 2020, retrieved from URL <https://www.microstrategy.com/us/resources/blog/bi-trends/seven-trending-technology-sessions-at-microstrateg>, 10 pages.

microstrategy.com [online], "Microstrategy 2019, The Platform for the Intelligent Enterprise" May 2019, retrieved on May 22, 2020, retrieved from URL <https://www.microstrategy.com/getmedia/4b9fbd76-952b-4da5-8f8d-489278abd59c/MicroStrategy-2019-whitepaper>, 14 pages.

microstrategy.com [online], "Build and Deploy HyperCards Using Workstation," Feb. 2019, retrieved on May 21, 2020, retrieved from URL <https://www.microstrategy.com/getmedia/8103f59b-3416-4a33-bd6a-2e99c9afd474/Build-and-Deploy-HyperCards-Using-Workstation>, 30 pages.

microstrategy.com, [online], "Whats New in Microstrategy 2019", 2019, retrieved on May 21, 2020, retrieved from URL <https://

(56) References Cited

OTHER PUBLICATIONS www.microstrategy.com/getmedia/de71bdb6-6d88-4e62-90d5-0e4a3cf94bb6/whats-new-in-microstrategy-2019>, 138 pages.
prnewswire.com "MicroStrategy 2019, the World's Most Advanced Analytics & Mobility Platform, Powers Decisions for Every Moment of the Day" Jan. 2019, retrieved on May 21, 2020, retrieved from URL <https://www.prnewswire.com/in/news-releases/microstrategy-2019-the-world-s-most-advanced-analytics-amp-mobility-platform-powers-decisions-for-every-moment-of-the-day-867142447.html>.
zdnet.com [online], "MicroStrategy 2019 introduces "HyperIntelligence" contextual BI,"Jan. 2019, retrieved on May 21, 2020, retrieved from URL <https://www.zdnet.com/article/microstrategy-2019-brings-introduces-hyperintelligence-contextual-bi/>, 6 pages.
constellationr.com [online], "MicroStrategy Embeds Analytics into Any Web Interface" Feb. 12, 2019, retrieved on Jan. 15, 2020, retrieved from URL <https://www.constellationr.com/blog-news/microstrategy-embeds-analytics-any-web-interface>, 8 pages.
Css-tricks.com [online], "Extracting Text from Content Using HTML Slot, HTML Template and Shadow DOM," Mar. 6, 2019, retrieved on Jan. 15, 2020, retrieved from URL <https://css-tricks.com/extracting-text-from-content-using-html-slot-html-template-and-shadow-dom/>, 6 pages.
Developer.mozilla.org [online], "High-level view," Jan. 29, 2018, retrieved on Jan. 15, 2020, retrieved from URL < https://wiki.developer.mozilla.org/en-US/docs/Web/Web_Components/Using_shadow_DOM$revision/1352031>, 6 pages.
Forbes.com [online], "These Ex-Israeli Surveillance Agents Hijack Your Browser to Profit from Ads," Jun. 9, 2015, retrieved on Jan. 15, 2020, retrieved from URL <https://www.forbes.com/sites/thomasbrewster/2015/06/09/from-israel-unit-8200-to-ad-men/#3ff26d7926e2>, 11 pages.
Github.com [online], "Non-invasive way of making highlights—maybe with an overlay? #291," Nov. 30, 2013, retrieved on Jan. 15, 2020, retrieved from URL <https://github.com/openannotation/annotator/issues/291>, 19 pages.
Github.com [online], "Textus," Oct. 27, 2012, retrieved on Jan. 15, 2020, retrieved from URL <https://github.com/okfh/textus>.
Glazkov.com [online], "What the Heck is Shadow DOM?," Jan. 14, 2011, retrieved on Jan. 15, 2020, retrieved from URL <https://glazkov.com/2011/01/14/what-the-heck-is-shadow-dom/>, 43 pages.
Medium.com [online], "Steps to Understanding the Shadow DOM," Feb. 22, 2019, retrieved on Jan. 15, 2020, retrieved from URL <https://medium.com/quick-code/understanding-the-shadow-dom-20e691cc611b>, 22 pages.
Microstrategy.com [online], "HyperIntelligence", available on or before Jan. 15, 2019, retrieved on Jan. 15, 2020, retrieved from URL <https://www.microstrategy.com/us/product/hyperintelligence>, 3 pages.
Nicolasleroy.fr [online], "TheFind launches price comparison service", Nov. 19, 2009, retrieved on May 14, 2012, retrieved from URL <http://www.nicolasleroy.fr/wp/2009/11/thefind-launches-price-comparison-service/>, 6 pages.
Robdodson.me [online], "Shadow DOM: JavaScript," Sep. 2, 2013, retrieved on Jan. 15, 2020, retrieved from URL <https://robdodson.me/shadow-dom-javascript/>, 11 pages.
Solutionsreview.com [online], "MicroStrategy 2019 Features New HyperCards and Federated Analytics," Jan. 7, 2019, retrieved on Jan. 15, 2020, retrieved from URL <https://solutionsreview.com/business-intelligence/microstrategy-2019-features-new-hypercards-and-federated-analytics/>, 4 pages.
Solutionsreview.com [online], "MicroStrategy Extends HyperIntelligence with New Platform Update," Jul. 1, 2019, retrieved on Jan. 15, 2020, retrieved from URL <https://solutionsreview.com/business-intelligence/microstrategy-extends-hyperintelligence-with-new-platform-update/>, 4 pages.
Vibrantmedia.com [online], "FAQs: Vibrant In-Text Advertising," retrieved on Mar. 31, 2011, retrieved, from URL <http://www.vibrantmedia.com/in-text_advertising/faq.asp>, 2 pages.
Vibrantmedia.com [online], "In-Text Demo," retrieved on Mar. 31, 2011, retrieved from URL <http://www.vibrantmedia.com/in-text_advertising/demo.asp>, 2 pages.
Wikipedia.com [online], "In-text advertising", Mar. 2017, retrieved on Jan. 15, 2020, retrieved from URL <https://en.wikipedia.org/w/index.php?title=In-text_advertising&oldid=770109369>, 2 pages.
Wikipedia.com [online], "Web Components," Dec. 2017, retrieved on Jan. 15, 2020. retrieved from URL <https://en.wikipedia.org/w/index.php?title=Web_Components&oldid=815726999>, 5 pages.
U.S. Notice of Allowance in U.S. Appl. No. 16/788,530, dated Feb. 22, 2021, 12 pages.
U.S. Office Action in U.S. Appl. No. 16/788,530, dated Jun. 25, 2020, 21 pages.
U.S. Office Action in U.S. Appl. No. 16/247,892 dated Jul. 15, 2021, 25 pages.
U.S. Office Action in U.S. Appl. No. 16/248,659, dated Jul. 16, 2021, 17 pages.

\* cited by examiner

FIG. 2

Ann Smith

Director, Sales Operations • asmith@hyperintelligence

🔗 Company Dossier

🔗 http://www.microstrategy.com abc Company Website

*712*

Apply

| Phone number | Current City | Department |
|---|---|---|
| Lexington<br>Home Town | Boston<br>Office Location | Skateboarding<br>Fun Fact |
| North America<br><br>Region | People<br>Management<br>Skills | Massachusetts<br>Institute of...<br>University |
| 3<br>Tenure | 0.89<br>Score | 0<br>Patents |

Self-starter who work with the team to bring the best product to the right customer

FIG. 7B

GENERATING AND PRESENTING CUSTOMIZED INFORMATION CARDS

CROSS-REFERENCE TO RELATED APPLICATIONS

This application is a continuation-in-part of U.S. patent application Ser. No. 16/247,892, filed on Jan. 15, 2019, which claims priority to U.S. Provisional Patent Application No. 62/720,955 filed on Aug. 22, 2018. This application is a continuation-in-part of U.S. patent application Ser. No. 16/248,659, filed on Jan. 15, 2019, which claims priority to U.S. Provisional Patent Application No. 62/720,955 filed on Aug. 22, 2018. This application also claims the benefit of U.S. Provisional Patent Application No. 62/810,498, filed on Feb. 26, 2019, and U.S. Patent Application Ser. No. 62/802,047, filed on Feb. 6, 2019. The entire contents of each of the prior applications is incorporated by reference herein.

BACKGROUND

Databases often include information about many topics. Users often retrieve content from issuing a query, for example, using natural language or using a structured query language (SQL).

SUMMARY

In some implementations, a computing system facilitates the generation and publication of customized information cards that can be tailored for specific organizations and users. The system can provide an interface for an administrator to select specific data sources and define a card format that draws specific types of information from those data sources. The system can also provide functionality for an administrator to associate specific card formats with specific entities and keywords, so that references to those entities and keywords trigger access to or display of the information cards. In addition, the system can publish the information cards throughout an enterprise's computing infrastructure so that the information cards can be accessed on many devices with very low latency. For example, the data defining the information cards and the keywords and other conditions for triggering their presentation can be provided to one or more server systems, and can also be predictively generated and cached (e.g., at servers and/or client devices). In some implementations, these techniques allow for the presentation of the information cards in one second or less after a user interaction that triggers surfacing of an information card. Once published, the information cards can be stored and made available throughout an enterprise's computing infrastructure, for presentation on any appropriate client device when the keywords for the information card appear (e.g., in on-screen content, in metadata, in voice input, on mobile devices, etc.).

The information cards provide live, dynamically updated data, so that sequential presentations of the same information card can provide different values for attributes and metrics as the information in the data source changes. The information cards can be defined to maintain connections with the underlying data sources, so that the information cards are refreshed with current data on an ongoing basis. As a result, the content in the information card can provide a dynamic, up-to-date window to a data source rather than a static set of content.

The system allows for the creation and presentation of information cards with many dimensions of customizability, including the ability to specify and adjust characteristics of an information card including one or more of, for example, (1) which information cards to provide, (2) the set of information to present in each information card, (3) the data source(s) the information is derived from, (4) the format of the respective information cards, (5) the keywords and/or conditions for presentation of the respective information cards, (6) the access control and availability of the respective information cards to users and systems. The user interfaces and/or application programming interfaces (APIs) provided by the system may enable these and other aspects of the information cards to be customized (e.g., specified and adjusted) through user input or through automated processing of the system. Each organization can customize the information cards that are used, and what those information cards represent (e.g., specific companies, people, locations, products, etc.). The information cards can be specific to the needs and relationships of the organization deploying the cards to its members. An information card can present a customized set of information, such as a customized subset of attributes and metrics for an entity. The information presented in the card can be drawn from a customized data source, e.g., a specific data cube, a private database, a combination of data sources, or other source. The information card can have a customized format, e.g., with a layout, style, and organization that is personalized for an organization. The information card can be triggered for display based on a customized set of keywords, e.g., an entity name as well as synonyms, aliases, related terms, abbreviations, etc. The system can also customize access to information cards, with information cards being selectively made accessible to different departments, groups of users, user roles, or individual users. Similarly, access to information cards and/or the content of information cards can be varied according for security and data access control based on a user's credentials, data access privileges, authentication level, and so on.

In addition, the information cards can be customized further for an organization and can be personalized for groups of users or individual users. For example, access logs and other usage data for an organization can be used to vary the types of content that an information card includes over time. If users frequently request or view a certain metric regarding a particular entity, the system can detect the high-frequency access and add the metric to an information card for the particular entity or make the metric more prominent (e.g., by adjusting position, ranking, size, etc.) As another example, the same information card may be presented differently for different users based on factors such as the user's usage history, user profile, preferences, role in the organization, and so on.

In many situations, it is extremely difficult for a system or an end user to pick the most important types of information that matter for an item (e.g., an entity, record, object, etc.) For example, most analytics systems have thousands of objects and data elements that are related to a given object or topic and could potentially be shown to a user. For example, a database may have information about objects with a "Customer" object type. Each object of this type may have dozens, hundreds, thousands, or more different associated data elements (e.g., attributes, metrics, records, etc.). If a user shows interest in a particular customer object, it can be very difficult for the system to determine which of the many available pieces of data are relevant and useful for the user. Further, the specific data elements that are most important for a given object may be different for different organizations and even for different groups of users or different individual users. As a result, a generic information card generally cannot provide the value that a customized card with a selection of data elements designed for a particular organization can provide.

Using information cards allows the system to associate key items with an object, thus enabling the system to show the most useful information about a topic. This is especially important on devices with voice interfaces and for embedded applications where the user doesn't have the user interface to scan or filter through thousands of possible objects. The information card for an object or object type can specify a specific subset of the most important data elements related to an object, helping ensure that the data presented is applicable and relevant to the user and the tasks the user is performing.

A computing device can run software that monitors conditions of the computing device and detects when content is relevant to the current state or operations of the computing device. For example, in response to detecting an appropriate context, event, or condition, the computing device presents an information card or a control allowing the user to access the information card. The information card can include a customized set of information selected from one or more data sources. In particular, the data sources may be public data sources, private databases or other internal records By defining and presenting custom information cards, an organization can automatically provide information from a public data source, private database or other custom data source at the specific time that the information is relevant to the user. In many cases, the card can be provided without requiring the user to request or seek out the information. Content relevant to a user's current task or activity can be provided, often without requiring the user to leave the current user interface. Thus, as a user creates a message, views a calendar appointment, looks up a contact from a contact book, or performs another activity, content determined to be related to the activity may be made available from the current user interface.

In many conventional systems, a user typically needs to submit a query, open or switch to a specific application, or otherwise take steps to request content from databases and other data sources. By contrast, techniques discussed in this document enable a computing device to dynamically select and provide database information without a user request, based instead on context such as content displayed by the computing device, a location of the computing device, messages to or from the computing device, and so on.

The ability to dynamically provide database content as the context of a computing device changes can be particularly useful for mobile devices. Software on the computing device that runs in the background can cause information cards to be presented on various interfaces of an operating system or third-party applications. For example, the presentation of information cards with database content can be integrated with a messaging application, a calendar application, search functionality, or any other application or interface.

As discussed further below, both the timing for providing database content and the selection of the content provided can be determined using context of the computing device. One aspect of context that is used is the presence of terms referring to entities, such as people, locations, objects, companies, etc., having corresponding records in a database. A computing system can dynamically retrieve and present information corresponding to an entity based on monitoring context-specific trigger conditions on a computing device. The information cards can include database content that is indexed by keywords, such as entity names, metadata for the entity, or topics associated with an entity classification. For example, a computing device can run an application that monitors activity on the computing device to determine if trigger conditions related to keywords have been satisfied. Examples of these triggers include the presence of an entity-related keyword in a user interface, an email or text message, a calendar reminder or record, a search query or search result, speech recognition of a voice query, a video or image collected by a camera, among others.

In general, any object in an analytics platform may serve as an "entity" that is the subject of an information card. Similarly, any object type may be an "entity type" as well. Cards are not required to be based on specific objects and object types, and can still provide information about people, places, things, and so on without a specific object being defined. Nevertheless, any object or object type, or an item that is represented or can be represented as an object or object type, can serve as the entity or entity type discussed below as the subject of an information card.

If a trigger condition is satisfied, the application causes an information card or information panel to be displayed on or spoken through the computing device. This technique allows a user to easily access or obtain information that is contextually relevant to actions performed on the computing device, without requiring the user to manually access the information or provide additional inputs. As discussed below, other techniques disclosed herein also provide other advantages, such as allowing users to receive information that may be difficult to manually retrieve from a database.

In some implementations, the information cards can be displayed on a computing device without requiring a user to request that information be displayed. The computing device can run an application that monitors actions performed on the computing device. The application uses the monitored actions to track the occurrence of keywords that can then be used to display information cards at specified points in time when the user is likely view information included in the information cards. For example, the application can monitor calendar data, including notifications or reminders issued by a separate calendar application, to detect an upcoming calendar appointment. The application determines that the calendar data includes text corresponding to an entity associated with a user information card. In response, the application then causes the information card to be displayed on the computing device. For example, the application can cause the information card to be presented along with a notification from the calendar application, or based on the appointment time (e.g., fifteen minutes before the start time of the calendar appointment so that the user can access relevant entity information during the calendar appointment). The application minimizes the burden imposed on the user, as the user does not need to open a calendar application, or look up an appointment, or even know that database content relevant to the appointment is available. Still, the computing system provides contextually-relevant information for the appointment triggered by monitoring the calendar data and without requiring the user to perform any actions to instruct the mobile device to retrieve the information card.

The keywords monitored by the application can be customized for different actions performed on the mobile device and a user's account. In some instances, the set of keywords that trigger display of database content are specific to a user or the user's organization. For example, when the user is an employee of a company, the keywords of interest can be extracted from a private database for the company. The keywords can additionally or alternatively be selected or filtered to terms applicable to the specific user, e.g., terms relevant to the user's role in the company. When one of the keywords is determined to be present in the user interface, the application communicates with a server system to obtain information related to the keyword. This information can include data retrieved from a private database that has information specific to an organization associated with the user.

In one general aspect, a method performed by one or more computers includes: receiving an indication of a data set; receiving data indicating a selection of an element of the data set; providing an indication of items in the data set that are associated with the selected element of the data set; receiving data indicating a selection of one or more of the items that are associated with the selected element of the data set; and storing card data defining an information card for the selected element of the data set, wherein the card definition data indicates (i) data indicating the selected one or more items, and (ii) a reference to the data set.

In some implementations, the reference to the data set is configured such that generating the information card based on the card data causes values for the selected one or more items to be derived from the data set and included for presentation in the information card.

In some implementations, the selection of the element of the data set or the selection of the one or more items is provided by a user.

In some implementations, the selection of the element of the data set or the selection of the one or more items is provided by a machine learning module.

In some implementations, the indication of a data set is a selection of the data set by a user.

In some implementations, the card data further includes presentation data indicating a layout or formatting for the selected one or more of items.

In some implementations, the card data indicates a first element of the data set designated for triggering display of the information card. The method includes obtaining data indicating a term corresponding to a context of a device; determining that the term matches at least one value for the first element of the data set; and in response to determining that the term matches at least one value for the first element of the data set, providing the information card for display by the device.

In some implementations, the selection of an element of the data set includes a selection of a particular attribute in the data set, wherein the data set includes multiple different values for the particular attribute. The card data enables generation of an information card instance for each of the different values for the particular attribute, the information card instances respectively having the selected one or more items populated with values corresponding to the different values for the particular attribute.

In some implementations, the card data further includes an indication of a user or group of users authorized to receive the information card.

In some implementations, the data set is a data cube, a database, or a collection one or more data files.

Other embodiments include corresponding systems, apparatus, and computer programs stored on computer-readable media, configured to perform the actions of the methods.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 2 is an example of a user interface for making information cards available on a client device.

FIGS. 7A and 7B are diagrams indicating user interfaces for creating or editing information cards.

Like reference numbers and designations in the various drawings indicate like elements.

DETAILED DESCRIPTION

Figure 1A:
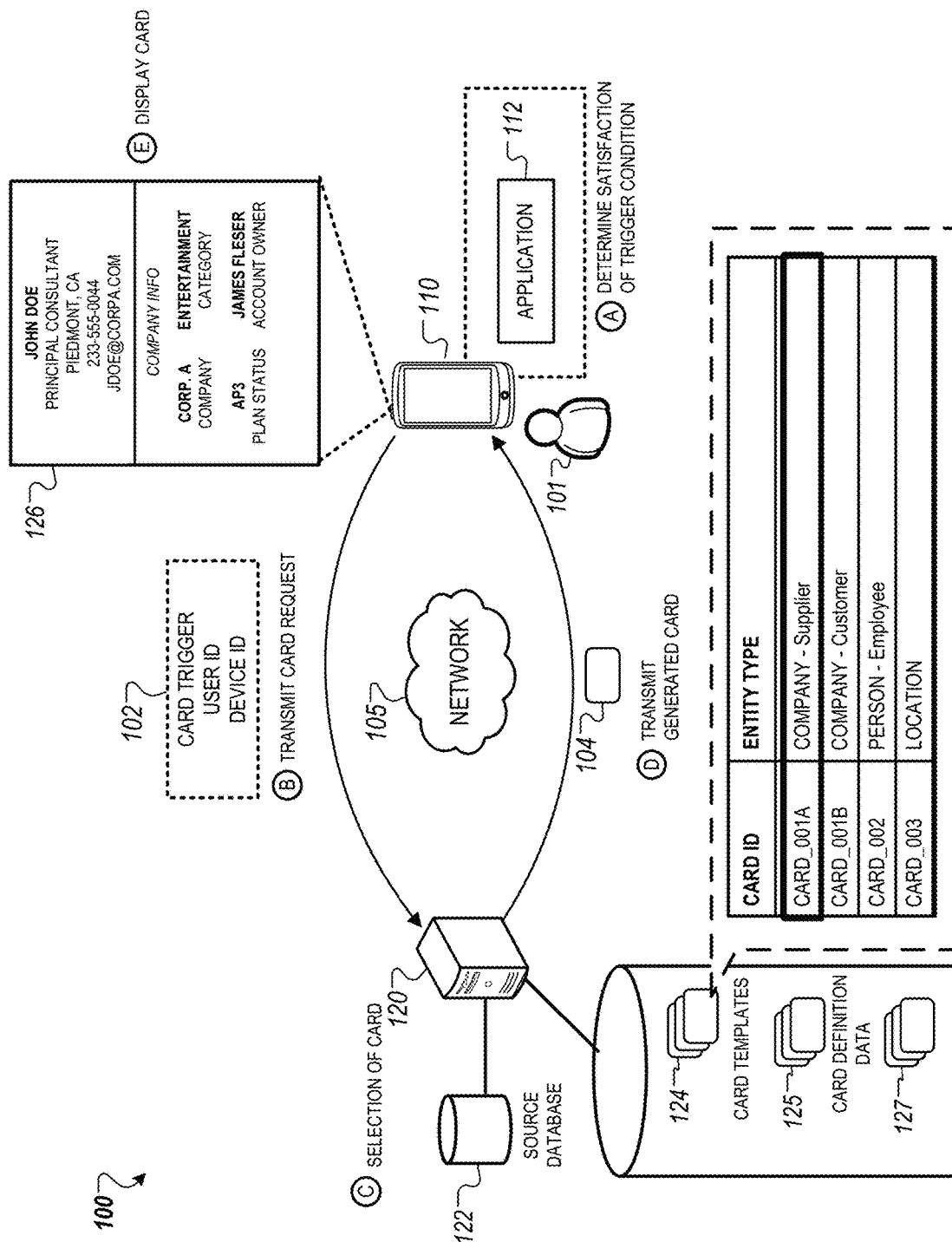
FIGS. 1A and 1B is a diagram showing an example of a system for generating and presenting customized information cards.

FIG. 1 illustrates an example of a system 100 that is capable of generating and presenting customized information cards. The system 100 includes a client device 110, a server 120, and a network 105. The server 120 has access to a source database 122 for an organization. The server 120 can be implemented using multiple computers that cooperate to perform the functions discussed below, and which may be located remotely from each other.

The client device 110 includes an application 112 that enables the client device 110 to dynamically generate and display contextually-relevant information cards in response to certain actions being performed on the client device 110 or certain conditions of the client device 110 being detected. As discussed below, the application 112 allows the client device 110 to obtain and provide information from the source database 122 through information cards that can be dynamically adjusted based on the actions or conditions detected on the client device 110. In some implementations, the application 112 runs in the background, out of view of the user, and monitors conditions of the client device 110 on an ongoing basis. The application 112 may interact with an operating system of the client device 110, for example, using one or more application programming interfaces (APIs), to obtain various types of content, such as image data and/or text displayed on screen, image data or text of user interfaces of applications (which may or may not be currently displayed on screen), device notifications, messages (e.g., e-mails or SMS text messages), calendar data, received radiofrequency beacon messages, and so on.

The client device 110 is associated with a user 101. When the application 112 is installed, a user identifier for the user 101 can be determined. For example, on installation or afterward, the user 101 may log in using one or more credentials. The application 112 may then customize various aspects of the system for the user 101, including the trigger conditions used to detect an appropriate context for providing an information card as well as the type of content included in information cards.

In the example, the user 101 is a member of an organization, e.g., an employee of a company. The source database 122 represents database records stored by or for the organization. The records are not publicly available and are subject to data access restrictions, such as requirements that users be issued credentials from the organization that grant authorization to access the records. Different users may be granted different levels of authorization, and the server 120 enforces access restrictions so that each user is only allowed to access the subsets of information the user is authorized to access.

The system 100 improves techniques used to provide users with access to information in a more convenient and contextually relevant fashion. Information is presented through information cards that are displayed at specified points in time based on the satisfaction of context-based trigger conditions representing the relevance of specific topics or keywords to the activities of the client device 110. In this manner, the system 100 improves the relevance of information that is displayed to a user based on actions performed on the client device 110 and ensures that the displayed information is likely to represent information that is of interest to the user, at the time information is of interest to the user. Unlike many other systems, the user 101 does not need to manually submit a query or select from a list to obtain the information. Instead, the application 112 initiates display of the information as it detects that the information corresponds to the current context of the client device 110.

In FIG. 1, information cards are presented on the client device 110 as cards that include information obtained from the source database 122. The cards can include dynamically generated information so that they reflect changes to data stored in the source database 122. For example, the server 120 can store card templates 124 that identify, for example, the format and structure of the cards. The specific information that is displayed in the cards can be dynamically populated into the templates at the time the cards are determined to be relevant, so that each display of a card includes information generated from up-to-date information from the source database 122. Thus, if the same card for the same entity is displayed at different times, the content may be different for each instance of the card as the information in the source database 122 changes.

The card templates 124 can include different templates for different types of entities. For example, one template may be used for a person, another template may be used for a company, another template may be used for a location (e.g., a particular store or region), and so on. Different card templates 124 may also be defined and used for entities having different semantic relationships with the user 101, the user's organization, or others. For example, a first template may be used for companies that are customers, and may specify a first set of statistical measures to display in a card. A second template for suppliers may specify a different set of statistical measures to display in a card.

The system can also store card-specific information in card definition data 125 that specifies the parameters of individual cards. The card templates 124 can each represent characteristics of cards for a particular type of entity or class of entities, and the card definition data 125 can specify the particular card parameters for specific entities. Although cards for different entities of the same type may use the same card template 124, each individual card may have specific information that affects its content and presentation. For example, a card definition for a specific entity may include, e.g., an entity identifier, an identifier of the card template to be used for the entity, an indication of the keywords to be used to trigger presentation of the card for the entity, a mapping of data source elements to the components of the card template (if not already specified in the card templates 124), and so on. For example, a card definition for a company "Example Co." may specify that the "CARD_001A" template should be used, and that the specific set of keywords that trigger display of that company's card are "Example Co.," "Example," and "EC." The card definition data 125 can include a card definition record for each information card made available in the system, indicating which entities and keywords to the card templates 124. The card definition data 125 can also be used to customize (e.g., alter or override) aspects of the card templates.

Briefly, in the example of FIG. 1, the application 112 on the client device 110 detects a context-based condition, such as a keyword representing an entity having corresponding information in the database 122. The application 112 causes the client device 110 to request an information card, and the server 120 selects an appropriate information card, generates the information card, and sends data for the card back to the client device 110 for display. The example is explained in further detail below with respect to various stages labelled (A) through (E).

In stage (A), the application 112 monitors activity on the client device 110 to detect satisfaction of a trigger condition that specifies display of an information card on the client device 110. Trigger conditions can represent activity on the client device 110 indicating that the user 101 is likely to view or hear information.

The trigger conditions can be monitored passively without requiring the user 101 to provide input on the client device 110. For example, detection of an entity term in the text corresponding to an upcoming calendar appointment through a calendar application of the client device 110 can represent satisfaction of a trigger condition indicating that a user is likely to view information associated with the entity. In this example, the client device 110 monitors calendar data of the calendar application without the user 101 actively requesting the information, which reduces the number of user inputs required to display contextually-relevant information (i.e., information for an entity that is a participant to the calendar appointment).

In another example, the trigger condition can represent a location of the client device 110 being detected to be within threshold proximity (e.g., within 100 meters) of a conference center that is associated with information cards. In this example, the application 112 determines that the user 101 is likely to view conference information based on the location of the client device 110 and thereby determines that a trigger condition has been satisfied.

In some instances, the trigger conditions can represent action performed by the user on the client device 110 that relates to a particular entity or topic. For example, detection of message that includes a term corresponding to an entity can represent satisfaction of a trigger condition related to displaying information of the entity. In some other examples, the trigger condition can represent a search query received for an entity term, or some action performed on the client device 110 that indicates that the user 101 is requesting information, e.g., performing a web search through a browser application, performing a search using capabilities of the operating system (e.g., for an application, a file, etc.), among others.

In stage (B), the client device 110 transmits a card request 102 to the server 120. The card request 102 can indicates the term(s) identified as corresponding to an entity, or an indication of the entity determined to be relevant to the current context. Accordingly, the card request 102 may include monitored data collected at the client device 110, such as data indicating the trigger condition that was determined to be satisfied by the application 112. The card request 102 can also include an identifier for the user 101 and/or the client device 110. The identifiers can be used to customize the information that is displayed on the client device 110. For example, the organization managing the source database 122 can specify different levels of access to the source database 122 based on a user classification specified by a user or device identifier. In this manner, the system 100 can generate and display different information cards for users in response to satisfaction of the same trigger condition.

In stage (C), upon receiving the card request 102, the server 120 accesses the source database 122 and generates one or more information cards that are provided to the client device 110 in response to the card request 102. The server 120 generates information cards that are relevant to entity terms corresponding to the trigger condition detected in stage (A). For example, the server 120 can generate cards that include information for an entity that the client device 110 identified in text in a user interface of the client device 110, such as a calendar appointment, a text message, a search interface, etc., even though the text is found in a user interface of the operating system or an application different from the application 112. In some situations, the reference to the entity has been detected by the client device 110 in data that is not part of a user interface, such as the content of a notification, message, or record accessed by the client device 110. In this example, the selected information cards can include information corresponding to the entity in the source database 122.

The server 120 can also perform various text processing techniques in selecting cards to provide for output to the client device 110. For example, the server 120 identify terms included in a text message received by the client device 110 and determine if the text message includes keywords that are associated with information stored in the source database 122, or are associated with a card definition from among the card definitions 125. The server 120 can compare terms in the text message with keywords associated with the source database 122 to identify matching terms. When server 120 identifies one or more matches with the keywords associated with the keywords indicated in the card definition data 125, the server 120 generates the appropriate card(s) from the card definitions. In some scenarios where keywords match the keywords of multiple cards, e.g., information cards for two employees with the same name, the server 120 can provide all relevant cards, rank the cards based on applicability or affinity to the user 101, or alternatively, request the user to provide additional information to determine the correct entity.

Generating an information card can include determining that a keyword matching a particular information card definition record has been found. The matching card definition in the card definition data 125 can specify an entity identifier for a particular entity, a card template 124 for generating the card, and locations of information about the particular entity in an appropriate data source. The server 120 then generates the card using the layout and content types specified by the appropriate card template 124, with values being populated from the data sources used to define the card. For example, the attributes and metrics specified for fields or regions of a card template 124 can be populated with values for the particular entity as determined from the source database 122. Of course, different card templates and even different individual cards may derive their information from different data sources and even from combinations of data sources.

Information cards can be generated on-demand, in response to card requests as noted above. In addition, or as an alternative information cards can be generated (e.g., by populating entity-specific information into the card templates 124) predictively, in advance of requests for the cards, and then cached. The cached cards can be refreshed periodically, e.g., after a certain time has elapsed or if the underlying data affecting the content of a card has changed. As a result, cached cards 127 can be made available with very low latency.

In stage (D), the server 120 transmits an information card 104 for presentation on the client device 110. In stage (E), upon receiving the information card 104 from the server 120, the client device 110 presents the information card 104 for display on a user interface 126. The information card 104 can be presented in or with the current user interface of the client device 110, which may be outside the application 112. For example, the information card 104 may be provided through the operating system (OS) functionality of the client device 110 outside of the application 112, e.g., as an OS notification. In general, the information card 104 may be displayed in, alongside, or on (e.g., as an overlay to) the application or interface that has the term(s) that triggered the presentation of the information card 104, such as the current interface of the client device 110, whether the current application or interface is one for messaging, search, calendar management, and so on, or even a lock screen or home screen showing general system notifications. In some instances, the information card 104 can be presented through the application 112, e.g., as an application message, or a data object presented on a user interface of the application 112. The information card 104 can also be displayed in different formats, such as an image, an interactive control configured to initiate display of the information, e.g., a button that displays the information in response to receiving a user input.

In the example depicted in FIG. 1, the application 112 detects an upcoming calendar event for an upcoming meeting with an employee of the entity "Corporation A." The application 112 determines that a calendar event trigger condition has been satisfied based on processing calendar data of the client device 110 and determining that text corresponding to the calendar event references the entity. The server 120 receives the card request 102 from the client device 110 and selects a card template and specifies the generation of an information card 104 for a supplier "JOHN DOE" identified in the calendar appointment. The server 120 obtains information associated with "JOHN DOE" from the source database 122 in order to populate a card template with information about the particular entity that is relevant to the user 101.

As shown in FIG. 1, the information card 104 displayed on the user interface 126 includes information for "JOHN DOE," an employee of company that is a supplier for the company of the user 101. The server 120 selects information for this employee from the source database 122 since the calendar appointment detected by the application 112 identifies "JOHN DOE" in the text of the calendar appointment. In this example, the system 100 therefore processes calendar data to determine that the user 101 has an upcoming meeting with "JOHN DOE" and would benefit from receiving employee information prior to or during the meeting.

In some implementations, the system 100 can be configured to deliver information cards to the client device 110 based on processing activity or usage data collected on the client device 110 and determine times when an information card is to be relevant to actions being performed on the client device 110, such as the user writing an email, the user viewing a calendar appointment, or other scenarios where the user accesses data corresponding to entity-specific information. For example, the server 120 can collect usage data collected by the operating system of the client device 110 that indicates application usage times, time periods of frequent device usage, types of applications or webpages being accessed by the user, among other types of usage metrics. The server 120 can use pattern recognition techniques to process the usage data to predict points in time when certain information cards are likely to correspond to terms that are being accessed during actions being performed on the client device 110. As an example, if the usage data indicates that the user frequently reads articles between 7 AM and 8 AM every morning that reference certain business entities, then the server 120 can provide information cards that include information on stocks for the business entities to the user during that time frame. The server 120 can also adjust the content included in the information cards over time so that only information for entities that are often referenced in the articles read by the user are included in the information cards that are provided to the client device 110.

Additionally, the application 112 can configure the client device 110 to display data representing the information cards in a non-obtrusive manner. For example, the application 112 can provide an operating system notification on the client device 110 once the client device 110 has received an information card from the server 120 instead of redirecting the client device 110 to the information card and potentially disrupting the present activity being performed by the user. In some instances, information cards that are received by the client device 110 over a certain time period can be accumulated by the application 112. A reminder can then be sent to the client device 110 at a specified point in time that allows the user to access all accumulated information cards. For example, a reminder can be displayed on the client device 110 every morning, when then allows the user to view information cards received on the preceding day.

In some implementations, the system is capable of outputting information cards or data associated with information cards while a user accesses various applications running on the client device 110. In such implementations, the application 112 can run as a background process and monitor user activity on other applications to detect the satisfaction of trigger conditions. For example, if a user highlights or selects text that is displayed through a web browser application on the client device 110, the application 112 can detect that a trigger condition has been satisfied and the highlighted or selected text can be used as entity terms to identify and output information cards corresponding to the highlighted or selected text. In some instances, the user can be provided with a notification that indicates that relevant information cards are available for the highlighted or selected text, and upon selection, the user can be directed to the application 112 to access the information cards.

Additional techniques that can be used to generate, present, and use the information cards discussed herein are described in U.S. patent application Ser. No. 16/247,892, filed on Jan. 15, 2019, U.S. patent application Ser. No. 16/248,659, filed on Jan. 15, 2019, and U.S. Patent Application Ser. No. 62/802,047. The features and techniques of each of these applications can be combined in whole or in part, and in any combination or subcombination with the features and techniques discussed herein. These applications are incorporated by reference herein as noted in the cross-reference to related applications above.

Figure 1B:
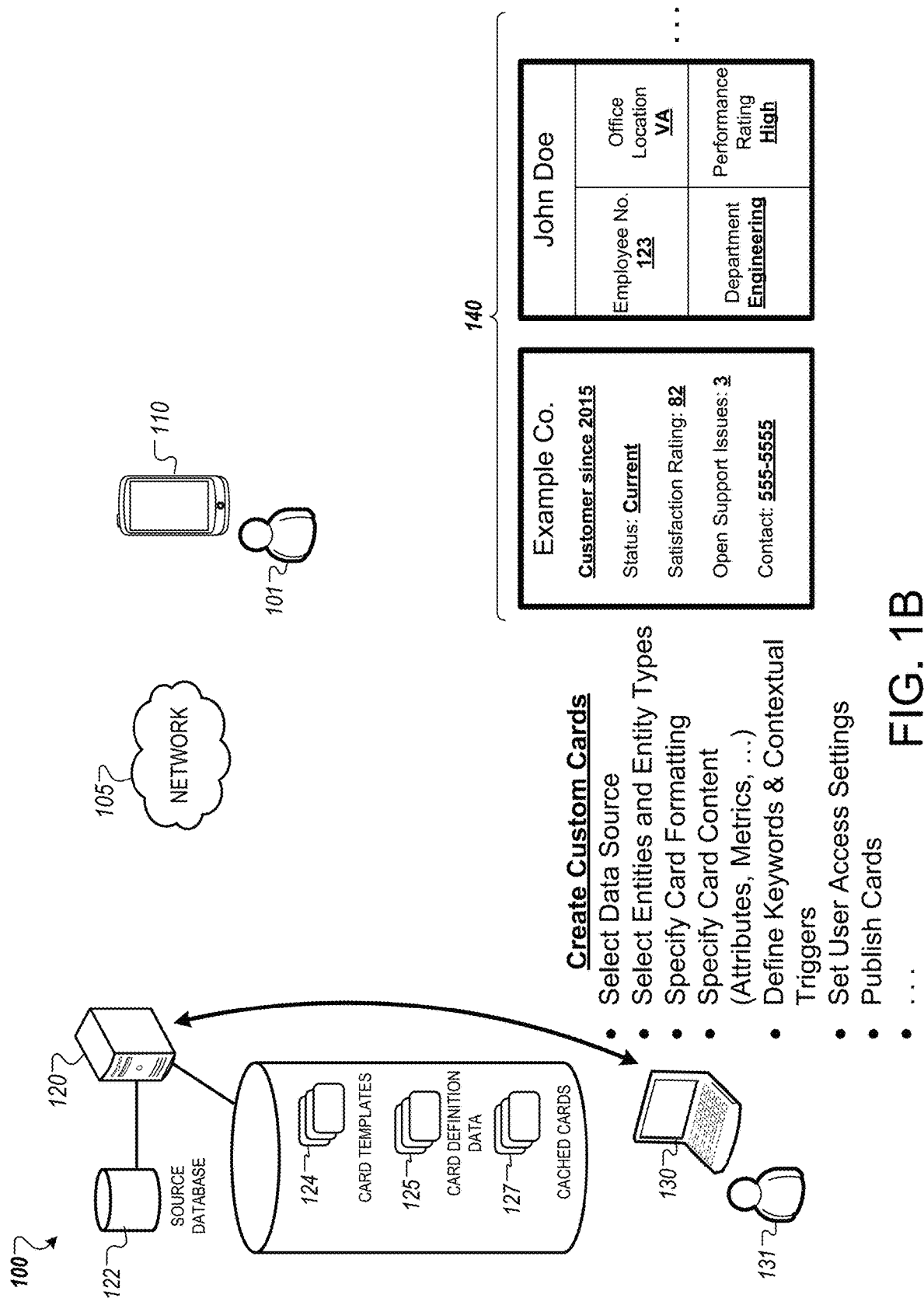

FIG. 1B shows that the system 100 enables an administrator user 131 to create and manage information cards using an administrator client device 130. The client device 130 interacts with the server 120 to provide user interfaces for the administrator 131 to design, manage and publish information cards for an enterprise or other organization. The administrator 131 can access a card creation user interface using the client device 130. The user interface can be provided by a webpage, a web application, a native application running on the client device 130, or other software.

From the user interface, the administrator 131 can create custom cards and specify both the content and behavior of the cards. For example, the administrator 131 may select a data source, which may be a specific data set or combination of data sets. From the information in the selected data source, the administrator 131 can specify entities and entity types for which cards should be created. The user interface can present indications of entities referenced in the data source, e.g., people, places, companies, and other entities. The administrator 131 can select a specific entity or an entity type to create a card for that entity or entity type.

The user interface includes controls that allow the administrator 131 to specify the layout and formatting for the card. This can include selecting a template that has regions or fields where data source elements can be inserted. To specify the content of the card, the administrator 131 can select attributes, metrics, or other information derived from the data set to insert into the regions or fields of the card being generated. For example, if the administrator 131 has selected a particular company as the entity for the card, the user interface can present a list of data elements that are available based on the content of the data set. For example, if the user has selected a particular company as the entity for the card, the user interface can present a list of data elements that are available based on the content of the data set, e.g., a location for the company, a number of employees of the company, revenue of the company, and industry for the company, and so on. These data elements may be specified directly in the data set, as a field or value of the data set, or may be derived from the data set using functions, equations, or other processing.

In some implementations, the user interface also shows related data that can be brought in from other data sources and incorporated into the card. For example, information about a company from an organization's internal database can be made available for inclusion, as well as suggestions of elements from other data sets that reference the same company. The server 120 can also find documents, such as reports and dashboards, that refer to the same entity as the card. The user interface can allow the user to include in the card hyperlinks or other controls to access these documents, so that users can quickly call up the information from an instance of the card.

In general, information cards can include a variety of interactive elements, including buttons, hyperlinks, sliders or filters, and so on that may enable a user to take an action, within the interface of the card or outside. For example, controls in a card may be selected to open documents, applications, or modules, or to initiate communication by starting a call or sending a message.

The user interface enables the administrator 131 to specify aspects of the behavior of the card being created. This includes setting keywords that, when present in the context of user's device, trigger presentation of the card. These keywords can include a name for the entity described by the card, nicknames and variations (such as abbreviations, acronyms, miss-spellings and so on), terms related to the content of the card, terms frequently used with references to the entity and other documents or in queries, etc. The server 120 may recommend keywords based on text that is associated with the entity in the data set used to generate the card.

The user interface enables the administrator 131 to specify contextual factors that can trigger presentation of interface enables the administrator 131 to set presentation of the card. These can include locations, times, the presents of devices or users nearby, and so on.

The user interface enables the administrator 131 to specify which users, applications, or other functionality can obtain the cards. For example, the administrator 131 can designate individual users or groups of users to receive the information card. In this case, only users so designated will be presented the card. As another example, the user interface can allow the administrator 131 to designate all users with a particular role or credential as recipients for the card. In a similar manner, the administrator 131 may specify that the card may be presented in a web browser through an extension, or through a mobile device in certain settings, such as in search results, on the messaging platform, based on calendar data, in response to detected locations, etc.

Once the card and its desired behavior are specified, the server 120 saves records of the cards, for example as card definition data 125 and/or card templates 124. The user interface enables the administrator to publish the cards, making them available to different users and devices.

Information cards and the data that defines them can be used for various purposes in addition to or instead of showing visual card presentations. For example, the elements defined for an information card can be used to generate audible, synthesized-speech outputs through a voice interface. For example, responses to voice queries from a user can be derived from the data in information cards. Similarly, the content of information cards can be used to identify common words and phrases for understanding users' voice requests as well as generating answers to those voice requests. As another example, the information from the information cards can be used in the process of generating customized natural language conversational agents (e.g., chat bots). Information about these techniques is provided in greater detail in U.S. Patent Application No. 62/802,047, and those techniques can be integrated in whole or in part with any or all of the techniques discussed herein.

The example of FIG. 1B shows examples of cards 140 that have been generated for different entities, a company "Example Co." and a person "John Doe." The information elements are linked to a respective data source, such as a data set or portion of the source database 122, so that changes in the values stored in the data source are propagated through to the different presentations of the cards 140, so that the presented cards reflect current information from the linked data source.

In some implementations, the server 120 can represent multiple servers that cooperate to generate and provide information cards. For example, completed cards can be published to a representational state transfer (REST) server. This server can make additions, get attributes, filter by attributes, generate HTML, and perform other functions. After being processed by the REST server, card data, reports, and underlying data sets (e.g., data cubes) can be cached in an intelligence server, which has the metadata for all of the cards that have been published. Later, when client devices retrieve cards, the intelligence server can provide a cached copy. In addition, client devices can predictively fetch and cache cards, based on prior usage patterns and/or analysis of a user's current tasks or data. These steps can significantly reduce the latency of the system in being able to detect the applicability of a card and present the card to a user.

Figure 2:
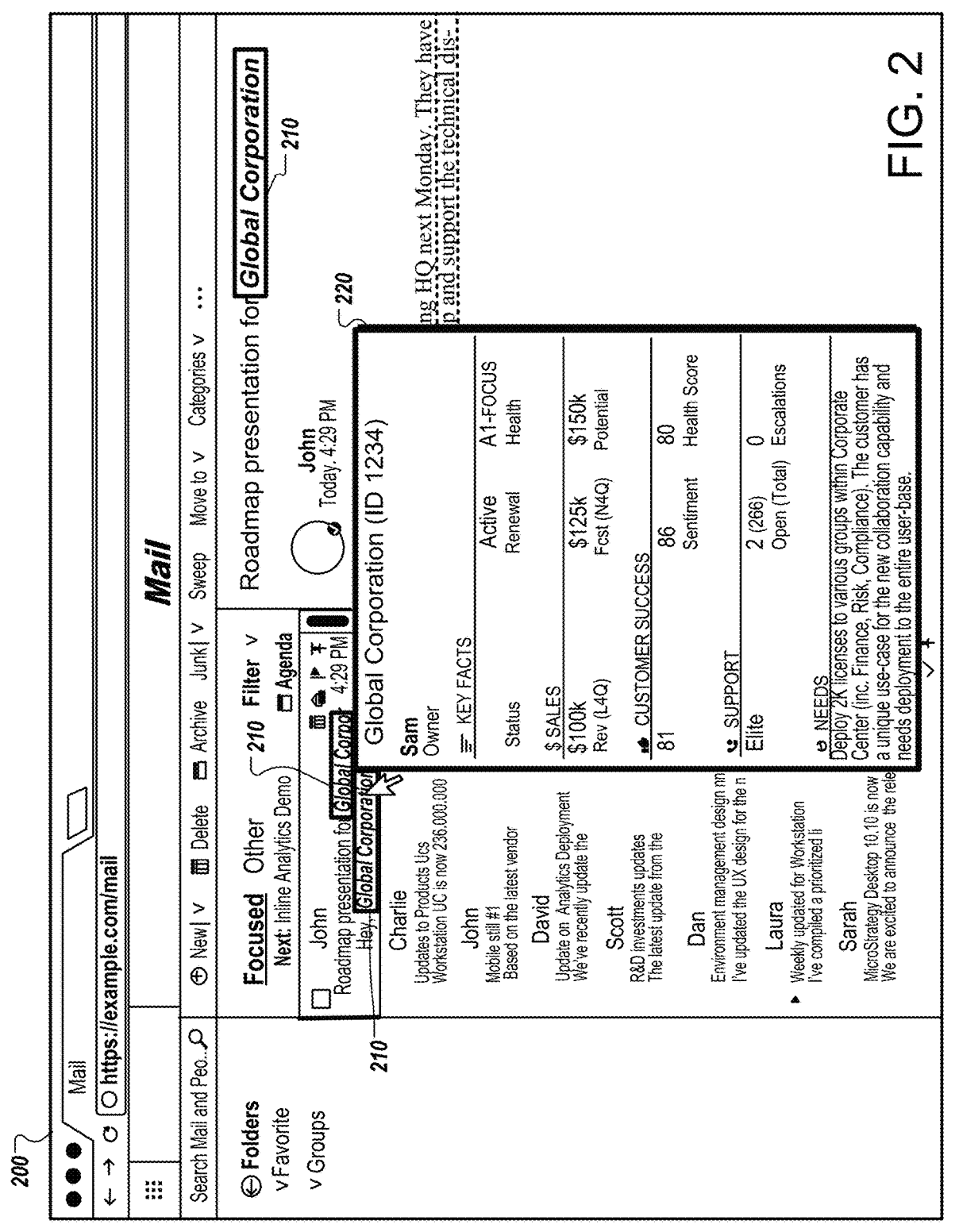

FIG. 2 is a diagram illustrating an example of a user interface 200 showing an information card provided in response to user interaction. In the example, the user interface 200 is one that may be provided by a client device. The particular example illustrated shows a web browser and a web page providing information from a user's e-mail account. Upon navigating to the web page, the client device obtains the text content to be displayed, e.g., content of the web page, and checks the text content for matches with a set of key terms, e.g., words or phrases indicated by a server system or stored at the client device. As discussed above each of the key terms has corresponding information in a database. A key term may refer to a particular entity, and the entity can have a particular information card template associated with it.

In FIG. 2, after navigating to the web page shown in the user interface 300, the system has determined that the phrase "Global Corporation" is matches an entry in a list of key phrases. In response, the client device annotates each instance 310 of this term in the user interface 200, shown here by bold and italic formatting and a box around the term. Other types of annotations can be additionally or alternatively used. Each instance of the key term is also made interactive.

When the user interacts with an instance 210 of the key term, the client device generates and provides an information card 220 corresponding to an entity represented by the term. As illustrated, the interaction can be a mouse-over event where a cursor rests on or near the annotated term for at least a minimum amount of time. This interaction can trigger the client device to request an information card from a server system. The information card can include any of various types of information relating to the entity indicated by the key term, such as values from a database, statistics, visualizations, links to further information, quantitative or qualitative ratings related to the entity, and so on.

In some implementations, to allow the client device to obtain the data for the information card, the server system (1) maps an identified key term indicated by the client device to a specific entity, (2) selects an information card template corresponding to the specific entity or a type or classification of that entity, and (3) retrieves information from a database relating to the specific entity, according to the types of information specified by the selected information card template. The server system can then send the data for the information card to the client device for display. In some implementations, this process is done in substantially real time. For example, the server system can be tuned and can cache information about various entities so that the client device can obtain and display an information card less than a threshold amount of time after detecting the user interaction (e.g., 3 seconds, 1 second, 0.5 seconds, etc.).

In some implementations, a browser extension or other software agent on a client device cooperates with a server system to allows detection of appropriate contexts to make information cards available. As an example, first, a browser extension makes a REST API request to obtain the list of topic elements (e.g., keywords or other context identifiers) for one or more data sources. These can be obtained by the server from card metadata, such as identifying attributes specified by card templates 124 and extracting values for the attributes from the underlying data set(s) used to generate cards. The topic elements can also be specified in other card definition data 125, in metadata repositories, caches, and so on. Second, the browser extension caches the set of received topic elements. Third, the browser extension monitors content of browsed pages to determine if content of the page matches any of the cached topic elements. When a match is found, the browser extension highlights the matching term and makes the element interactive. Fourth, the browser extension receives data indicating user interaction with the highlighted term, such as a hover over the highlighted term. Fifth, the browser extension makes a REST API call to get the data corresponding to the highlighted element from the source data set for the appropriate card matching the highlighted term. The server provides content, such as HTML data, that provides the content for the card. Fifth, the extension renders and displays the card based on the received data. Many variations are possible, however, including the pre-loading of card content on the client in response to finding topic elements in a page, before a user interacts with the highlighted term.

The additional techniques in U.S. patent application Ser. Nos. 16/247,892, 16/248,659, and 62/802,047 can also be used for obtaining, presenting, and otherwise using the information cards discussed in this document. Similarly, the systems, processes, and information cards discussed in this document can have properties as discussed in U.S. patent application Ser. Nos. 16/247,892, 16/248,659, and 62/802,047.

Figure 3:
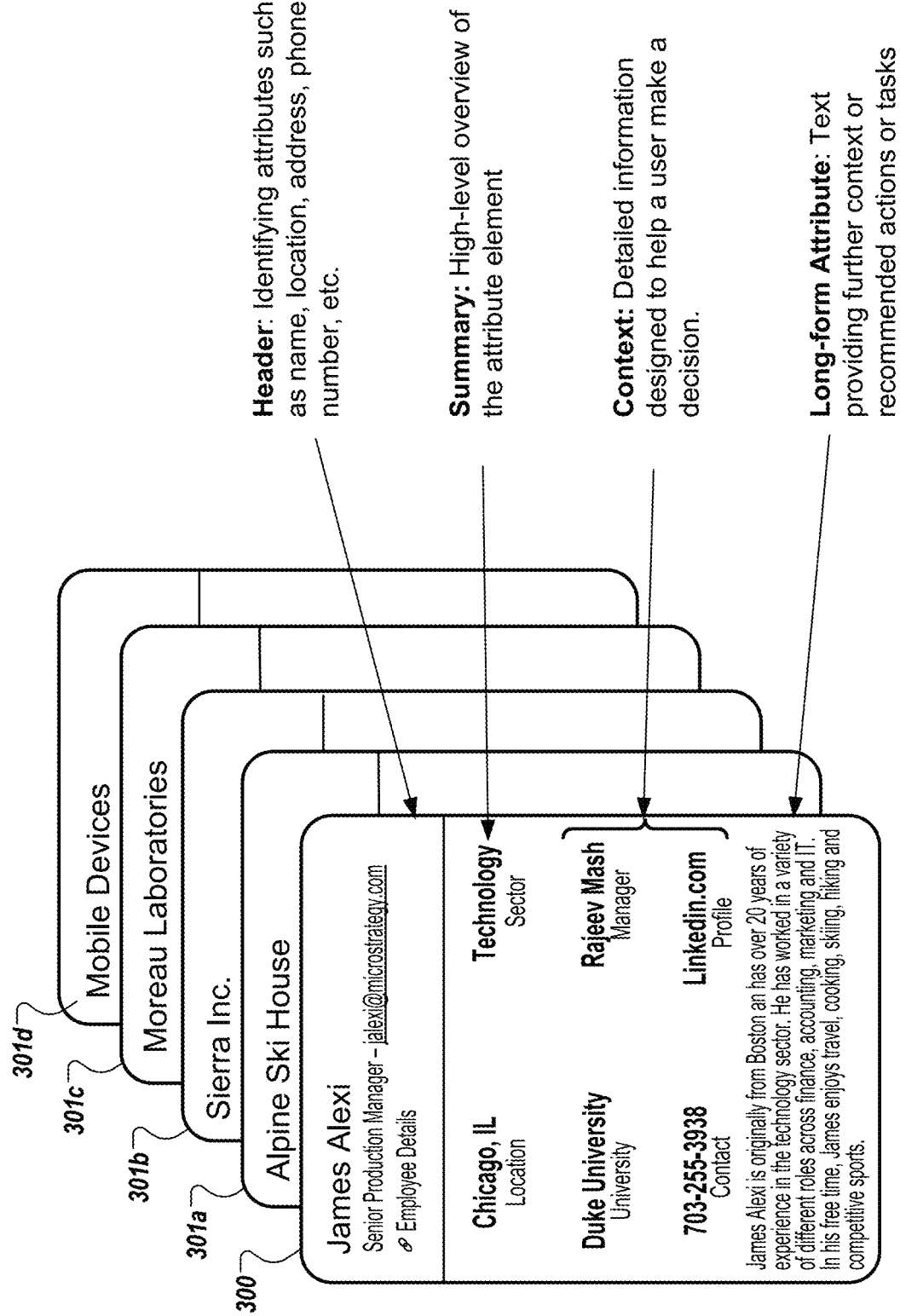
FIG. 3 is a diagram illustrating an example of an information card.

FIG. 3 shows an additional example of an information card 300. The content and style of information cards can vary from one organization to another, from one entity type to another entity type, and for different entities. Other information cards 301a-301d can be defined in a similar manner.

As illustrated, the card 300 can include a header, which can include identifying attributes such as a name, a location, and address, phone number, and so on. The header may also include interactive elements such as a link to a web page for the entity, a link to initiate sending a message, a control to access one or more documents or database records corresponding to the entity, and so on In some implementations, the main body of the information card includes various indicators, such as values for attributes and metrics, text, visualizations, or other elements derived from one or more data sets. As noted above, these values may be derived from private data sets, but are not limited to information from private data sets. The indicators may include summary elements, as well as context information. In some cases, at least some of the attributes provided as indicators are tailored to the needs of a specific task or role. For example, a card for presentation to a customer service agent may include information to help the agent quickly identify outstanding issues and initiate communication to address them. Information cards may include text, such as a long-form attribute that includes notes, recommended actions, tasks, and other information.

Cards may be defined in terms of attributes or other data elements in an analytics platform. One card can be defined for an entity type or object type, using the attributes of that entity type or object type. For example, in the card shown in FIG. 3, the card for an employee can specify a location attribute, a sector attribute, university attribute, a manager attribute, a contact phone number attribute, and a profile link attribute. After this entity type card has been defined, each time an instance of an employee identifier is found, e.g., in on screen content, and metadata, or in other device context, the entity type card can be used to generate a card for the applicable employee, by populating values for the attributes from one or more data sources.

Figure 4:
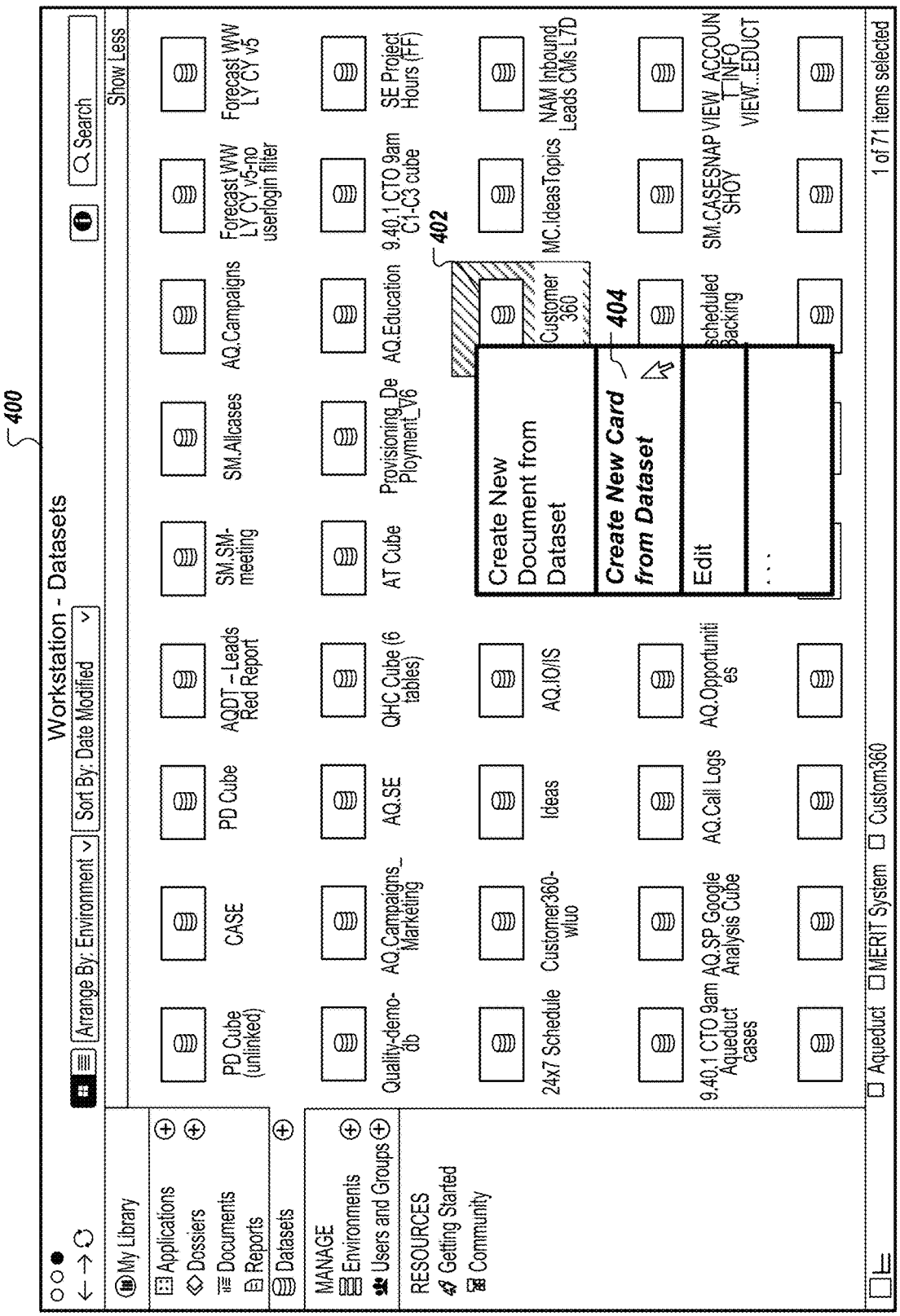
FIGS. 4-6 are diagrams showing user interfaces for creating and managing information cards.

FIG. 4 shows a user interface 400 of a client device, such as client device 130 from FIG. 1B, which can be used to initiate the creation of a new card from a data set. The user interface 400 shows various data sets that are available in an analytics platform.

The process of creating an information card can include a user importing, identifying, selecting, or otherwise accessing a dataset. This can be done through any interface or gateway of an analytics platform. As an example, a user may create or access a data cube (e.g., an online analytical processing cube) or other data set. The user can select the data set and interact with control to begin creating an information card from the cube. In some cases, this can be as simple as a "right-click" or hover over an icon representing the data set, and selecting an option for creating a card, such as an item "create a card" or "publish to extensions" from a context menu that appears. The indication that a card should be made can cause the system to provide a card creation user interface that shows properties of the data set, such as a list of attributes, metrics, entities, or other elements referenced in the data set.

In the example of FIG. 4, a user selects one of the data sets, for example by right-clicking on an icon 402 for the data set, and in response the system shows a context menu with various options. One of those options is item 404, an option to create a new card from the data set. Selecting this option causes the system to provide the user interface shown in FIG. 5.

Figure 5:
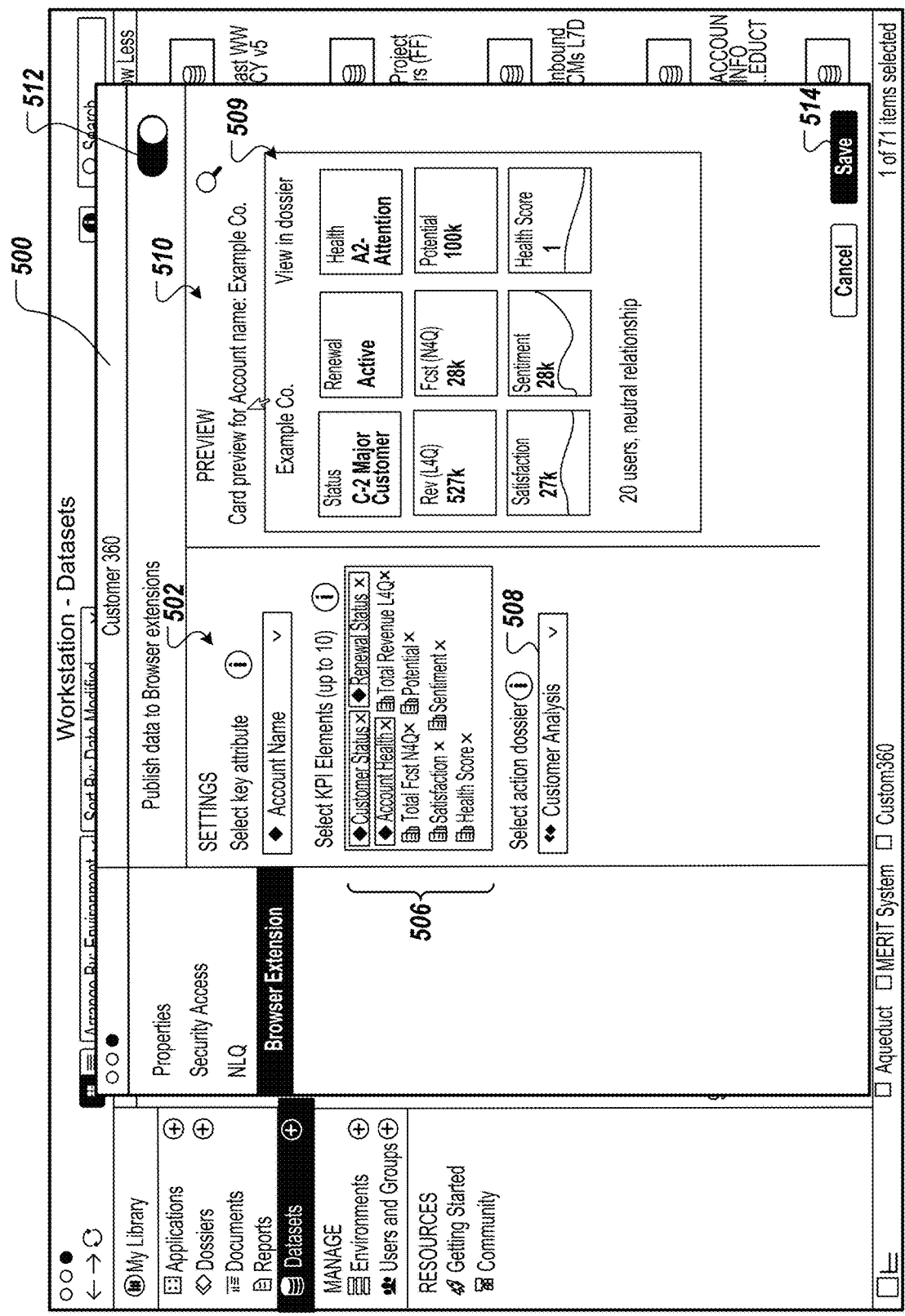

FIG. 5 shows a card creation interface 500 that allows the user to define the content and characteristics of a card. The card creation user interface 500 can include a settings pane 502 showing elements of the data set, as well as a preview pane 510 that previews how the card will look and can be manipulated to place and organize elements to be displayed in the card.

The user interface 500 displays data elements from the data set that can be used to define the card. These are shown in a settings pane 502. One of the data elements can be designated as a key attribute, for example, by selection from a list using a drop-down menu 502. The key attribute can specify the main entity type for object type that the card will represent. In the example, a key attribute of "account name" is selected, and as a result, the card being generated will be used to create individual cards for different accounts. As another example, selection of "employee name" as the key attribute could be used to generate a card for different employees in the data set. The key attribute may be used to define elements of the card's header, such as the name or title of the card, and one or more initial keywords for triggering presentation of the card.

Once the key attribute is selected, the system populates a set of data elements 506, e.g., attributes and metrics shown as "KPI elements," that are related to the selected key attribute in the data set. These data elements 506 can represent the types of data available in the data set for the objects of the type indicated by the key attribute. Each data element 506 may represent, for example, a column from a data cube or table. Data elements 506 may also represent the results of applying different functions or aggregations to a data set, e.g., computing a mean, maximum, minimum, or other measure based on the data set that the user selected in FIG. 4. The user can select from these data elements 506 to add them to the card. For example, the user may drag and drop the data elements 506 onto locations on a preview pane 510. As another example, the user may simply select desired data elements 506, in the system may arrange them.

The settings pane 502 includes a control 508 that enables a user to select a document to link to the card. The selected document can be indicated in the card, with a hyperlink or other control 509 that user can select to initiate opening of the selected document.

On the right hand side of the user interface 500, the preview pane 510 shows an example card presentation based on the current selections and settings from the user. Although the card format being defined will be used for each of the different accounts in the data set, the preview pane here shows and example card populated for a specific account, the account of "Example Co." This allows the user to see the effects of changes and selections in real time as parameters of the card are adjusted. As shown in the example, each individual indicator can include a value for an attribute as well as a label or attribute name. For example, the indicator in the upper left corner includes the attribute label "status" and a value "C2—Major Customer." In some cases, other information is provided in addition to or instead of indicator values in text or numeric form. For example, indicators may be represented with colors, icons, animations, images, charts, graphs, and so on. In FIG. 5, the indicators in the bottom row each have a line that indicates how the attributes have changed over a period of time. This effectively includes a graph in the indicator area to show a progression over a period of time (e.g., one month, three months, 1 year, etc.) as well as including the current value for the indicator.

The user interface 500 or another user interface can include controls to allow or restrict access to the generated card. For example, a control 512 can set whether to automatically publish the new card to user devices through browser extensions. Similar controls can be included for making cards available through other functionality, such as location-based presentation, e-mail applications, calendar applications, search functionality, messaging platforms, and so on. In addition, user interface controls can be provided to allow the user to specify specific users or user groups that can receive the current card type or, more generally, cards based on the current data set.

After the card is completed, the user can select a control 514 to save the card. From the selections on the interface 500, the system will save the card information to allow multiple cards that can be presented—not just a single card for the "Example Co." account, but a displayable card element for each unique value in the data set for the "Account Name" key attribute. As a result, if there are 20 accounts in the data set, saving the card format can allow the defined type of card to be displayed for any and all of the 20 different accounts. Of course, additional interfaces can be provided if desired to customize or adjust individual cards in addition to or instead of adjusting cards as a group.

To facilitate card generation, the system can make available standardized templates that a user can select to apply predetermined combinations of layout and formatting attributes. For example, a template may provide a three-by-three grid of containers, each configured to provide a metric or attribute, so the user can add 9 different data elements. The template can also include other elements such as a header region, a footer region, a title, etc. which can also be populated and customized. Of course, the interface can include controls allowing a user to set or adjust layout and formatting as well. The interface can enable a user to select elements of the data set and assign positions for the selected data elements to be displayed. For example, the interface can enable a user to drag data set elements (e.g., attributes, metrics, etc.) and drop the elements into specific fields or containers of a card template. Doing so can create links between the card and specific portions or elements of the data set, which can be used in an ongoing manner to refresh the content of the card from the current values in the data set.

When adding an element from the data set, the system can automatically configure properties of the card based on the characteristics of the data set. For example, when a user drags an attribute from a data set to a region of the card template, the system can identify a data type for the attribute value (e.g., text, integer, unit of time, dollar amount, geographical location, etc.) and apply formatting for that data type. The system can also look up a human-readable name or explanation for the attribute type, e.g., determining and adding to the card a "Number of Employees:" descriptor for the attribute value if the attribute represents a number of employees. In addition, the system can identify a record or portion of the data set representing that attribute. If the card being generated is for a specific company and the attribute is number of employees, for example, the system can identify and store, in card definition data, a field or set of records used to determine the value of the attribute from the data set for that specific company. In general, the card generation process creates mappings between elements of the card (e.g., portions of the card, or fields of a card template) with portions of the data set.

In some implementations, each information card can be created individually. For example, the process of creating cards can be done for each individual entity, e.g., a first card is created for "Company 1" with a first, custom subset of attributes and metrics included in the card; a second card is created for "Company 2," with second, different custom subset of attributes included in the card; and so on.

In some implementations, cards can be generated in groups or batches, for example, linked to a master card definition or card template that specifies card content types and not only general formatting and layout. This can speed the process of creating cards and can increase efficiency. For example, the system may create one generic entity type card for object type "employee." This entity type card can be used to provide card presentations for all objects of the "employee" type, with the card presentation for a specific employee having card content and metadata (e.g., keywords for triggering) populated from the attribute values for the specific employee.

As an example, the interface can enable a user to create a card representing an entity type (e.g., a supplier company, a customer company, an employee, a person, etc.), and provide indications of the data elements available for entities of that entity type. Once the template or generic entity type card for the entity type is specified by the user, the system can use it to create cards for any entity of the entity type that is in the data set. This can enable many cards to be created quickly, and with uniformity in the content of the cards (e.g., with the same or similar subsets of attributes and metrics for entities of the same type). The system may derive, from the template or generic entity type card, a specific card definition for each entity of the entity type. The individually-defined cards can then be separately customized and edited further, since even for entities of the same type different individual entities may have differing types of information that is most relevant. This can include creating separate card definitions for each entity's card, and specifying in those cards the links to the data set needed to populate each card with the corresponding entity's data. In some implementations, a user may create a card for a single instance of an entity type, and then select to apply the characteristics of that card to other instances of the same entity type. For example, a user may create a card for a first company, then extend the card definition (e.g., the selection of attributes and metrics, the organization and formatting, etc.) to all other companies described in the data set, thus creating a card of the same type for each of the companies. In other implementations, a template or generic entity type card can be stored and can be used repeatedly to dynamically create cards for entities of a particular type, without storing separate individual card definitions for individual entities.

The information cards can include embedded rules or conditions that may vary the content or presentation of the cards based on different conditions. For example, the inclusion of certain content or the formatting of content can be conditional. Thresholds can be set for an attribute or metric, and if the value meets predetermined criteria (e.g., inside or outside of a certain range), that attribute may be highlighted or otherwise emphasized. Rules or conditions defined for a card can also be used to personalize the card for different types of end users. For example, the rules may specify that one attribute is shown for users in one department and a different attribute is shown instead for users in a second department.

The system may use machine learning to automatically generate cards or to suggest content for cards. In some cases, the system can predictively suggest cards to be generated and content for the cards (e.g., subsets of attributes and metrics that are most commonly used). For example, the system can access usage data indicating, for example, rates of co-occurrence of different terms in documents of an organization, query histories from users of the organization, counts of interactions with different elements of documents, time spent viewing or interacting with different documents, and so on. From this usage data, the system may infer which entities referenced in a data set are most significant as well as which attributes and metrics are most often used with those entities or entities of the same types. The system can then recommend the creation of cards for the identified entities, and can recommend that the most commonly used attributes and metrics be presented in the cards. As users view cards and interact with the cards, the system can record further usage information that the system can use to alter the content of cards and to provide better recommendations in the future.

As noted above, each card can be designed with one or more key terms (e.g., words, phrases, numbers, data points, patterns, etc. referred to generally as "keywords" herein) specified for the card, so that the occurrence of the one or more keywords can trigger the presentation of the card. Users may manually enter these keywords, select them from values taken from the data set linked to the card, or enter them in other ways. In some implementations, the keywords are values corresponding to attributes associated with a card. The system may suggest keywords to the user for inclusion as well, based on characteristics of the data set and other cards. The card creation user interface can provide information about an attribute of an entity as well as synonyms. For example, a user may define a card for a person, and specify that the card title (e.g., a primary key) is the person's name (e.g., a "name" attribute from the data set). This selection can also cause the system to import other attributes as keywords to trigger presentation, such as an "initials" attribute in the data set, a "nickname" attribute, and others, and link these attributes with the same card. The values of all of these attributes can be set as keywords that can be used to trigger presentation of the card. In some cases, the related attributes may be taken from a data set different from the data cube or other data set that a user selects as the basis for the card. For example, the system can use an entity identifier from the data cube or even as manually specified by the user creating the card to retrieve other information from a different data source, which can be added to the user interface and used to define the card.

The keywords for a card may or may not appear visibly in the card. For example, the name of an entity may appear in the card, and the name may be a keyword for the card. In addition, any of the other values in the card may also be potentially used as keywords for the card, automatically or through manual selection of the card's creator. As a result, keywords are not required to match only to the name or primary attribute for a card. As an example, a card for a person may include the name of a company the person works for as an attribute derived from a data source and displayed in the card. Similarly, the occurrence of a keyword that triggers display of the card may or may not include display of the keyword on a display of a client device. In many instances, at least some keywords that can trigger presentation of a card are not displayed in the card and instead are stored in metadata.

In some implementations, cards are designed with specified conditions for presentation instead of, in addition to, and/or in combination with keywords. For example, each card can have metadata, such as hidden fields or associated parameters that are not visually displayed in the card but are stored and evaluated by the system. This metadata can specify contextual attributes that specify when a card should be displayed or otherwise made available. These contextual attributes can include locations, times, the presence of certain devices or users (or devices or users of certain types or classifications), the occurrence of an event related to an entity, an attribute or metric for the entity meeting particular thresholds or having a particular status (whether the attribute or metric is shown in the card or not), and so on. With these contextual attributes defined, a card can be automatically presented or made available when, for example, a user's device is near any person from a specific department, when the user's device is near a specific person, or when the user's device is in a specific geographical area or in a specific type of geographical area (e.g., within a retail store). There can be multiple different contexts or conditions that each separately trigger displaying of a card, and each context may be defined in terms of multiple contextual attributes (e.g., time, location, conditions or thresholds for data about the organization being met, etc.).

These contextual triggers defined for cards can be especially helpful for use with mobile devices. Some attributes or contextual factors may be focused specifically on use cases for mobile devices. As an example, a card may have embedded metadata of location (e.g., a GPS coordinate or other location data) so that the mobile device receiving the card knows the location corresponding to the card. The mobile device then can move from place to place, and if the mobile device detects that it is within a particular range of the specified location can surface the card for the location.

A mobile device can periodically refresh the set of cards it stores based on its current location, so that the mobile device had available the set of cards applicable for nearby locations. In some cases, the system or a user defines a radius of interest (e.g., a 10-mile radius). When an application on the mobile device is opened, the mobile device will download and cache various points of interest cards. The mobile device compares its location to the locations for the cards, and when it detects sufficient proximity to one of the locations, the mobile device presents the corresponding card. As an alternative, a mobile device can send data indicating its location to a server, which can then determine that the mobile device is near the location corresponding to one of the cards and send the card to the mobile device for presentation.

When a user creates a card, the card is linked to the data source(s) that the user selected, such as a specific data cube. As a result of this linkage, data security and access control for the underlying data source(s) flow through to the content of the card. Access restrictions are enforced for each user, each card, and each time the card is displayed. By applying identity-based or object-level security policies, if a user is not authorized to access data for any of the different information elements within the card, the system will generate the card to show a dash, a blank area, or other indication that the data is not available. This allows for control of security at a fine-grained level.

In some implementations, different cards may be created for different user roles or different groups of users. For example, for a given company, a different card or card template may be used to generate cards shown to users in an engineering department than have different content (e.g., show different attributes and metrics) than cards shown to users in the finance department. When multiple cards are available, the different cards can be targeted to different users based on, for example, a user's role, interests, user profile, usage history, and so on.

Cards that are created can be published to allow access to specific users and sets of users. For example, the system may provide an interface that identifies users and available cards, and that allows an administrator to manually add or remove users from an access list. This can be done for individual users and with respect to individual cards or at a higher level of aggregation. For example, the system may group cards by entity type (e.g., supplier company, customer company, location, etc.), by author, by data source, by keyword or subject matter, by types of metrics and attributes included, and so on. Similarly, the system may group users by user type, role, location, access privileges or credential type, department in an organization, similarity in usage patterns, and so on. The interface to the system may indicate one or more of these different aggregations of cards and users, and can provide controls that allow an administrator to select a card or group of cards to be made available for a group of users. The system can also certify card content (e.g., with certificates, signatures, etc.) to indicate the information is trusted, and can verify the certification on presentation to ensure that only legitimate content appropriate for the user is provided by the system.

Figure 6:
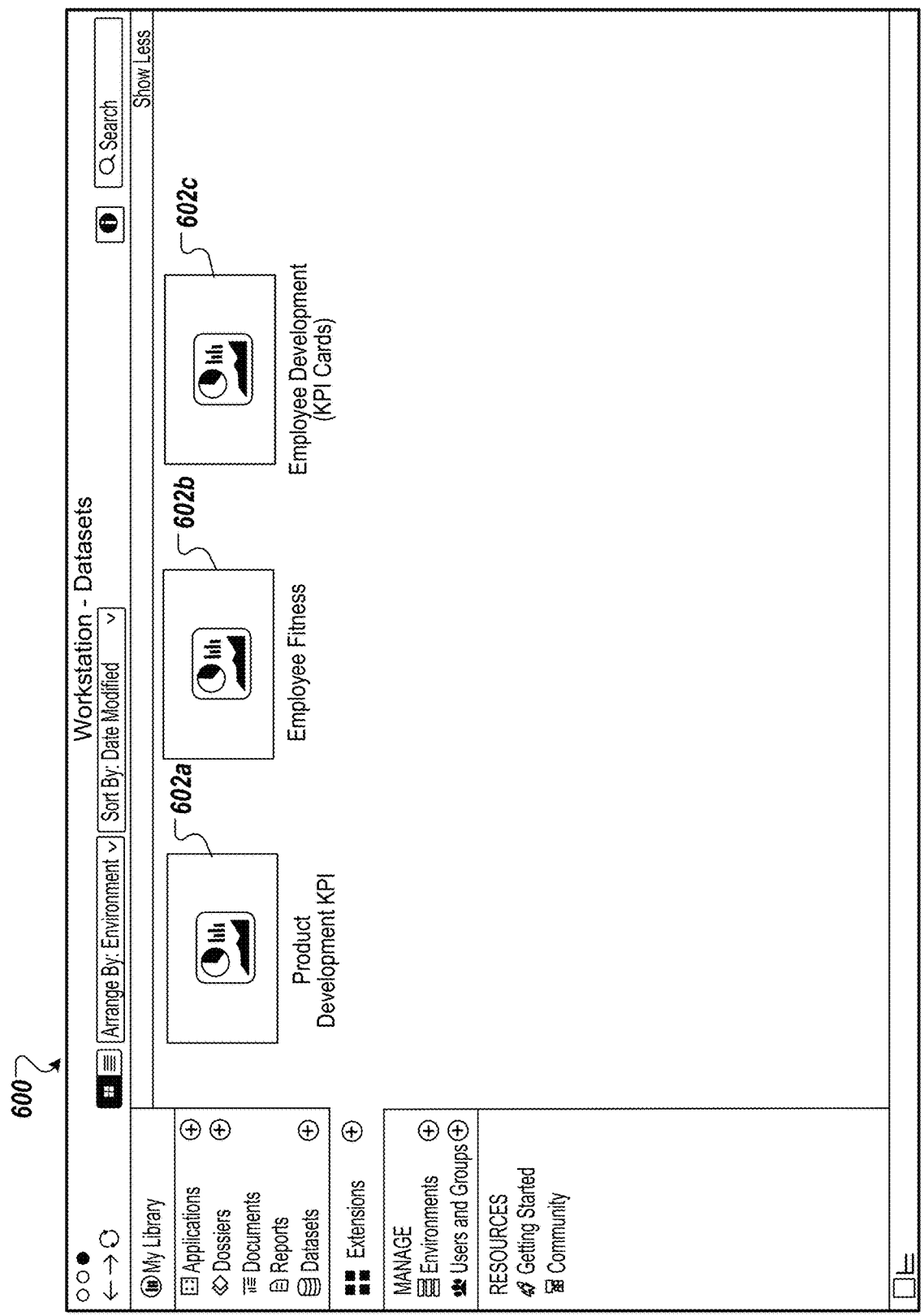

FIG. 6 shows a user interface 600 that the system can provide to allow management of created cards. The user interface 600 can provide a central interface to author and manage all embedded and extended content. The interface 600 shows objects 602a-602c, each of which represent a card or collection of cards. From this interface 600, the user can drag and drop cards to different computing environments to make them available on different servers and to different sets of users. The user interface can also allow the user to set access control restrictions, assign cards to specific users or user groups, adjust the keywords or contextual factors for presentation of cards, and adjust other parameters of the cards. In addition, the interface 600 may include controls that adjust how the cards 602a-602c are managed by the server and client devices, such as to specific whether and to what extent a card or its underlying data set should be cached at the server or client devices, a frequency that cached data should be refreshed, and so on.

Figure 7A:
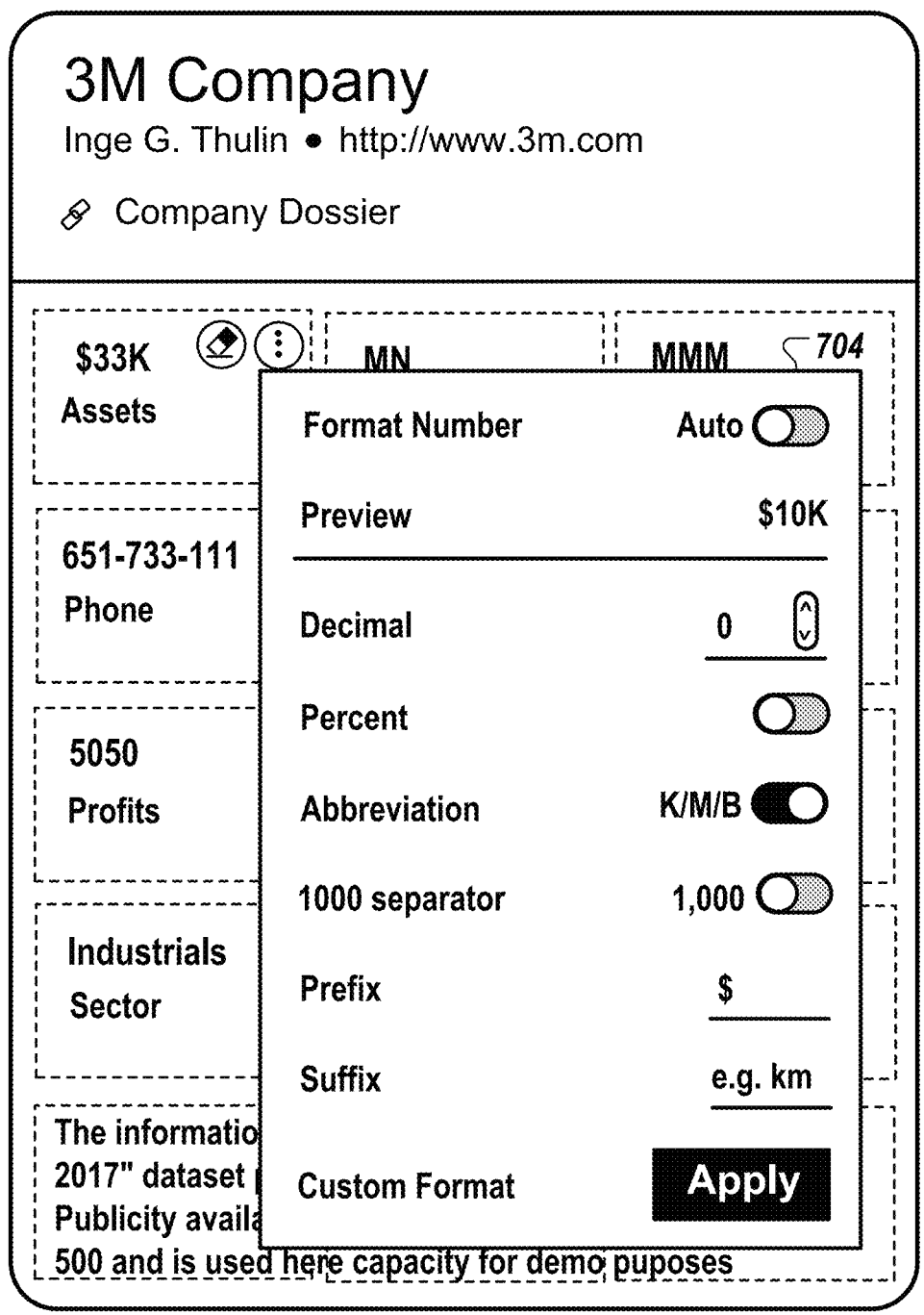

FIG. 7A shows an example of a card 700 being generated or edited. The card includes several regions for the placement of indicators (e.g., attributes, metrics, etc.), with the various regions being designated with dashed lines. A first region 702 represents an "Assets" element, and a user has selected a control in the region 702 to edit the formatting or display properties. This interaction caused an overlay panel 704 to be displayed, with various controls for adjusting how the data values for the attribute will be displayed. Options include setting the number of digits, including abbreviations, punctuation, a prefix, a suffix, and so on. The content of the overlay panel for an indicator can vary based on the data type of an attribute value as well as metadata from the data set from which the attribute is derived. In addition to the adjustments shown on the panel 704, the contents of the different regions 702 can altered, for example, the indicator specified can be deleted, replaced with a different indicator, can be expanded or restricted to cover a different time range, and so on.

FIG. 7B shows another example of a card 710 being generated or edited. The interface shows a panel 712 that allows an interactive control, such as a hyperlink, to be added and edited, to provide access to other content within or outside the analytics platform.

Figure 8:
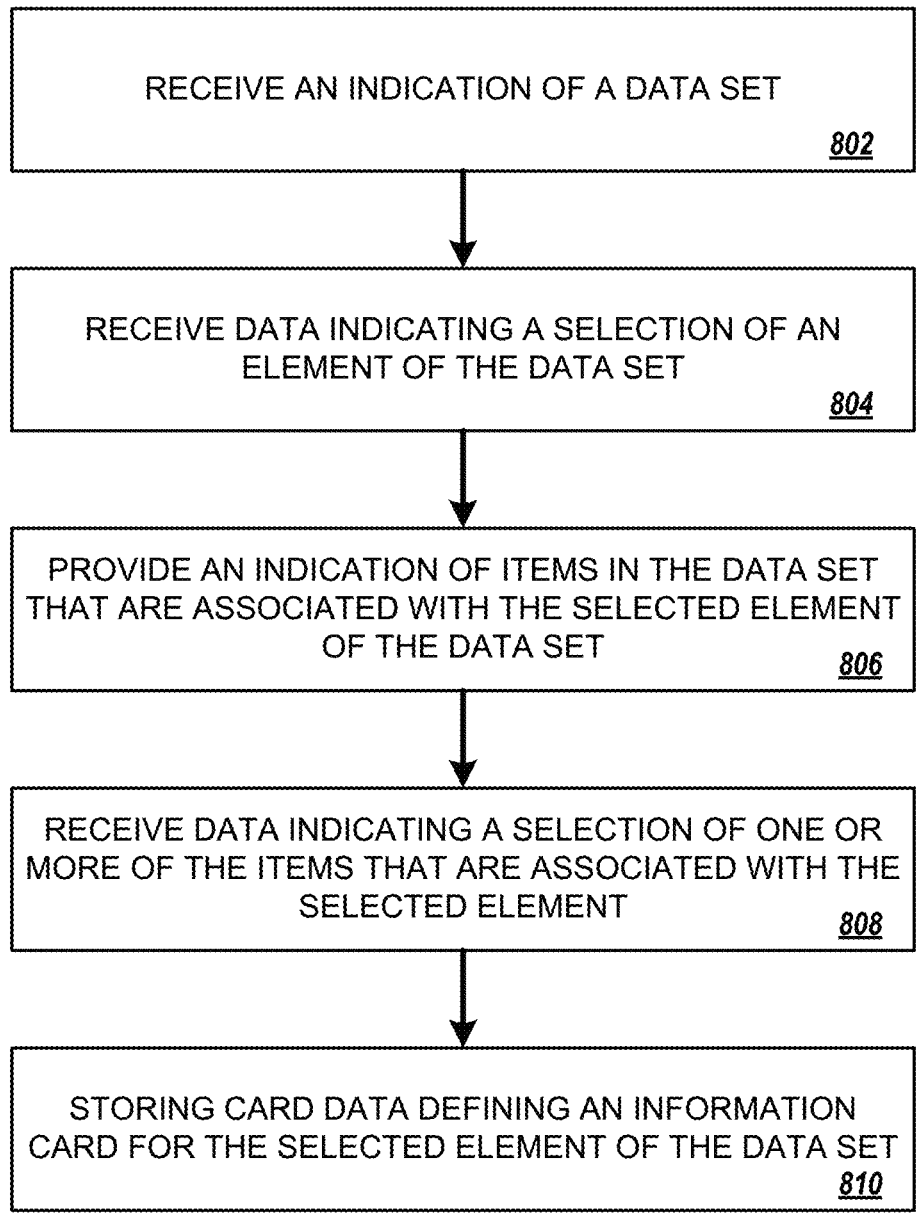
FIG. 8 is a flow diagram that illustrates an example of a method for generating and presenting information cards.

FIG. 8 is a flow diagram that illustrates an example of a method 800 for generating and presenting information cards. The method 800 can be performed by one or more computers, for example, the server 120 discussed above.

The one or more computers receive an indication of a data set (802). For example, the indication of a data set can be a selection of the data set by a user. A user may select a data set or file using a user interface. The data set can be a data cube, a database, or a collection one or more data files.

The one or more computers receive data indicating a selection of an element of the data set (804). For example, an element of the data set can be selected, for example, a entity such as a person, place, company, product, device, etc. In some implementations, the selection of the element is made by a user. In some implementations, the selection of the element is made by a machine learning module.

The one or more computers provide an indication of items in the data set that are associated with the selected element of the data set (806). For example, the items can be attributes or metrics of the data set. An attribute can refer to an entity, concept, or object, such as a product, employee, month, and so on. Attributes can be data fields or descriptive entries or values for a subject. For a person, an attribute could be, for example, a name, address, phone number, education level, user name, job title, etc. In some cases, an attribute can refer to a static value in data field or a label. A metric can be a measure or key performance indicator. For a company, examples include revenue, profit, employee headcount, and probability of purchase. From a practical perspective, metrics are the calculations performed on data stored in a data set, the results of which are displayed or used in other ways. Accordingly, a metric can refer to a calculated value or the result of evaluating expression that is based at least in part on records in the data set.

The one or more computers receive data indicating a selection of one or more of the items that are associated with the selected element of the data set (808). In some implementations, the selection of the one or more items is made by a user. In some implementations, the selection of the one or more items is made by a machine learning module. The machine learning module can be one that has been trained to identify data items that are most commonly used (e.g., requested, viewed, copied, shared, etc.) by a set of users, such as users in a group, department, organization, or geographical area. Based on access logs and/or other usage records showing how portions of the data set and/or other data sets have been used, the machine learning model can be trained to identify the data items with the strongest affinity to a data element. Given characteristics of a data element, such as an element type (e.g., person, location, device, etc.) and other characteristics of the data element, the trained machine learning model can provide output indicating a relative importance of various data item types, and the items given the highest importance scores can be selected for inclusion in the information card. In some implementations, selections by the machine learning model can be presented on a user interface and then confirmed or altered by a user.

The one or more computers store card data defining an information card for the selected element of the data set (810). The card data can indicate (i) data indicating the selected one or more items (e.g., attributes or metrics), and (ii) a reference to the data set. The card data can be card definition data that specifies the content of an information card to be displayed for an entity, such as an entity represented by the element of the data set. The card data can specify the type of content, e.g., the types of measures or indicators to be included in the information card when it is generated. The reference to the data set is configured such that generating the information card based on the card data causes values for the selected one or more items to be derived from the data set and included for presentation in the information card. The reference to the data set can be configured so that a device generating or presenting an information card based on the card data can refer to the data set and obtain current information to populate the card, e.g., by retrieving or calculating up-to-date values based on the current contents of the data set at the time the information card is presented. For example, the reference can be a link, file name, universal resource indicator (URI), etc. The card data can include presentation data indicating a layout or formatting for the selected one or more of items. The card data can include an indication of a user or group of users authorized to receive the information card.

The card data can also indicate triggers and/or conditions that may cause the information card to be displayed. For example, the card data can indicate a first element of the data set designated for triggering display of the information card. The one or more computers can later obtain data indicating a term corresponding to a context of a device, determine that the term matches at least one value for the first element of the data set, and in response to determining that the term matches at least one value for the first element of the data set, provide the information card for display by the device.

In some implementations, the selection of an element of the data set includes a selection of a particular attribute in the data set, wherein the data set includes multiple different values for the particular attribute. The card data enables generation of an information card instance for each of the different values for the particular attribute, the information card instances respectively having the selected one or more items populated with values corresponding to the different values for the particular attribute.

A number of implementations have been described. Nevertheless, it will be understood that various modifications may be made without departing from the spirit and scope of the disclosure. For example, various forms of the flows shown above may be used, with steps re-ordered, added, or removed.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method performed by one or more computers, the method comprising:
  receiving, by the one or more computers, an indication of a data set;
  receiving, by the one or more computers, data indicating an element of the data set that is selected by a user, wherein the selected element corresponds to an entity type, an entity of the entity type, or a type of data present in the data set for entities of the entity type;
  providing, by the one or more computers, an indication of items that are associated with the selected element of the data set;
  after providing the indication of the items that are associated with the selected element of the data set, receiving, by the one or more computers, data indicating one or more items selected by the user to be included in information cards for entities of the entity type, the one or more items being selected from among the items that are associated with the selected element of the data set;
  based on the received data indicating the one or more items selected by the user, generating, by the one or more computers, an information card template for the entity type, wherein the information card template specifies that information cards generated based on the information card template include values for the one or more items selected by the user; and
  after generating the information card template for the entity type, providing, by the one or more computers, content of an information card for a particular entity of the entity type to one or more devices of one or more other users, wherein the content of the information card has values for the one or more items specified by the information card template, the values being determined for the particular entity based on data about the particular entity in the data set.

2. The method of claim 1, wherein the information card template includes a reference that identifies the data set such that generating an information card based on the information card template causes values for the selected one or more items to be derived from the data set identified by the information card template.

3. The method of claim 1, wherein the information card template further comprises presentation data indicating a layout or formatting for the selected one or more of items.

4. The method of claim 1, wherein the information card template indicates a first element of the data set designated for triggering display of the information card;

wherein the method comprises:
obtaining data indicating a term corresponding to a context of a device;
determining that the term matches at least one value for the first element of the data set; and
in response to determining that the term matches at least one value for the first element of the data set, providing the information card for display by the device.

5. The method of claim 1, wherein the selection of an element of the data set comprises a selection of a particular attribute in the data set, wherein the data set includes multiple different values for the particular attribute; and
wherein the information card template enables generation of an information card instance for each of the different values for the particular attribute, the information card instances respectively having the selected one or more items populated with values corresponding to the different values for the particular attribute.

6. The method of claim 1, wherein the information card template further comprises an indication of a user or group of users authorized to receive the information card.

7. The method of claim 1, wherein the data set is a data cube, a database, or a collection one or more data files.

8. The method of claim 1,
wherein receiving an indication of a data set comprises receiving data indicating a selection by the user of a data set from among a plurality of different data sets indicated on a user interface;
wherein the method comprises providing, for display in the user interface, data for user interface controls to design a user-defined information card based on the selected data set;
wherein providing the indication of items in the data set that are associated with the selected element of the data set comprises providing data identifying attributes or metrics that are related to the entity type and are available based on the selected data set; and
wherein receiving the data indicating one or more of the items selected by the user comprises receiving data indicating user interactions with the user interface controls to select, from among the attributes or metrics available based on the data set that are related to the entity type, a subset of attributes or metrics to be displayed in the new user-defined information card.

9. The method of claim 1, comprising providing a control in a user interface for the user to enable or disable the use of the information card template to generate information cards based on the information card template.

10. The method of claim 1, comprising using the information card template to provide information cards for different entities of the entity type, wherein the information cards for the different entities have different sets of values populated for the one or more items, the sets of values being determined based on the information about the different entities in the data set.

11. The method of claim 1, wherein the information card template specifies data fields representing keywords designated to result in triggering generation and display of information cards based on the information card template.

12. The method of claim 1, wherein the information card template specifies a position at which the one or more of the items selected by the user items are presented in information cards generated based on the information card template.

13. The method of claim 1, wherein the data set is a data cube or database, and wherein the items include one or more items that represent (i) columns of data in the data set or (ii) results of applying different functions or aggregations to the data set.

14. The method of claim 1, wherein selecting the element comprises selecting a key attribute from among a set of attributes in the data set.

15. The method of claim 1, wherein receiving data indicating the element of the data set that is selected by the user comprises receiving, over a communication network from a client device of the user, data indicating user input by the user at a user interface of the client device, wherein the user input selects the element from among multiple elements of the data set indicated by the user interface.

16. The method of claim 15, wherein providing the indication of the items that are associated with the selected element of the data set comprises, providing, over the communication network, data indicating attributes or metrics that are associated with the selected element and for which values for the attributes or metrics are included in or are derivable from the data set.

17. The method of claim 16, wherein receiving the data indicating one or more items selected by the user to be included in information cards for entities of the entity type comprises receiving data indicating second user input to the user interface that selects a subset of the attributes or metrics indicated in the data provided over the communication network; and
wherein generating the information card template for the entity type comprises generating the information card template to specify display of values for the subset of attributes or metrics indicated in the data provided over the communication network.

18. A system comprising:
one or more computers; and
one or more computer-readable media storing instructions that, when executed by the one or more computers, cause the one or more computers to perform operations comprising:
receiving, by the one or more computers, an indication of a data set;
receiving, by the one or more computers, data indicating an element of the data set that is selected by a user, wherein the selected element corresponds to an entity type, an entity of the entity type, or a type of data present in the data set for entities of the entity type;
providing, by the one or more computers, an indication of items that are associated with the selected element of the data set;
after providing the indication of the items that are associated with the selected element of the data set, receiving, by the one or more computers, data indicating one or more items selected by the user to be included in information cards for entities of the entity type, the one or more items being selected from among the items that are associated with the selected element of the data set;
based on the received data indicating the one or more items selected by the user, generating, by the one or more computers, an information card template for the entity type, wherein the information card template specifies that information cards generated based on the information card template include values for the one or more items selected by the user; and
after generating the information card template for the entity type, providing, by the one or more computers, content of an information card for a particular entity of the entity type to one or more devices of one or more other users, wherein the content of the information card has values for the one or more items specified by the information card template, the values being determined for the particular entity based on data about the particular entity in the data set.

19. The system of claim 18, wherein the information card template includes a reference to the data set that is configured such that generating an information card based on the information card template causes values for the selected one or more items to be derived from the data set and included for presentation in the information card.

20. One or more non-transitory computer-readable media storing instructions that, when executed by one or more computers, cause the one or more computers to perform operations comprising:

receiving, by the one or more computers, an indication of a data set;

receiving, by the one or more computers, data indicating an element of the data set that is selected by a user, wherein the selected element corresponds to an entity type, an entity of the entity type, or a type of data present in the data set for entities of the entity type;

providing, by the one or more computers, an indication of items that are associated with the selected element of the data set;

after providing the indication of the items that are associated with the selected element of the data set, receiving, by the one or more computers, data indicating one or more items selected by the user to be included in information cards for entities of the entity type, the one or more items being selected from among the items that are associated with the selected element of the data set;

based on the received data indicating the one or more items selected by the user, generating, by the one or more computers, an information card template for the entity type, wherein the information card template specifies that information cards generated based on the information card template include values for the one or more items selected by the user; and after generating the information card template for the entity type, providing, by the one or more computers, content of an information card for a particular entity of the entity type to one or more devices of one or more other users, wherein the content of the information card has values for the one or more items specified by the information card template, the values being determined for the particular entity based on data about the particular entity in the data set.

\* \* \* \* \*

UNITED STATES PATENT AND TRADEMARK OFFICE
CERTIFICATE OF CORRECTION

| | |
|---|---|
| PATENT NO. | : 11,238,210 B2 |
| APPLICATION NO. | : 16/730417 |
| DATED | : February 1, 2022 |
| INVENTOR(S) | : Siamak Ziraknejad et al. |

It is certified that error appears in the above-identified patent and that said Letters Patent is hereby corrected as shown below:

In the Claims

In Claim 7, Column 27, Line 25, delete "collection one" and insert -- collection of one --.

Signed and Sealed this
Tenth Day of May, 2022

Katherine Kelly Vidal
*Director of the United States Patent and Trademark Office*